US012634649B2

(12) United States Patent
Yang et al.

(10) Patent No.: US 12,634,649 B2
(45) Date of Patent: May 19, 2026

(54) CLUSTERING AUDIO OBJECTS

(71) Applicant: Dolby Laboratories Licensing Corporation, San Francisco, CA (US)

(72) Inventors: Ziyu Yang, Beijing (CN); Lie Lu, Dublin, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 162 days.

(21) Appl. No.: 18/547,006

(22) PCT Filed: Feb. 15, 2022

(86) PCT No.: PCT/US2022/016388
§ 371 (c)(1),
(2) Date: Aug. 18, 2023

(87) PCT Pub. No.: WO2022/177871
PCT Pub. Date: Aug. 25, 2022

(65) Prior Publication Data

US 2024/0187807 A1 Jun. 6, 2024

Related U.S. Application Data

(60) Provisional application No. 63/202,227, filed on Jun. 2, 2021, provisional application No. 63/165,220, filed on Mar. 24, 2021.

(30) Foreign Application Priority Data

Feb. 20, 2021 (WO) ................ PCT/CN2021/077110
Jun. 8, 2021 (EP) .................................... 21178179

(51) Int. Cl.
*H04S 7/00* (2006.01)

(52) U.S. Cl.
CPC ............ *H04S 7/30* (2013.01); *H04S 2400/11* (2013.01)

(58) Field of Classification Search
None
See application file for complete search history.

(56) References Cited

U.S. PATENT DOCUMENTS 7,904,797 B2 3/2011 Wong
8,824,688 B2 9/2014 Schreiner
(Continued)

FOREIGN PATENT DOCUMENTS

CN 106385660 B 10/2020
EP 3780661 A2 2/2021
(Continued)

OTHER PUBLICATIONS

Liu et al., Multiple Speaker Tracking in Spatial Audio via PHD Filtering and Depth-Audio Fusion, IEEE Transactions on Multimedia ( vol. 20, Issue: 7, Jul. 2018).

*Primary Examiner* — Qin Zhu

(57) ABSTRACT

A method for clustering audio objects may involve identifying a plurality of audio objects, wherein each audio object of the plurality of audio objects is associated with respective metadata that indicates respective spatial position information and respective rendering metadata. The method may involve assigning audio objects of the plurality of audio objects to categories of rendering metadata of a plurality of categories of rendering metadata, wherein at least one category of rendering metadata comprises a plurality of types of rendering metadata to be preserved. The method may involve determining an allocation of a plurality of audio object clusters to each category of rendering metadata. The method may involve rendering audio objects of the plurality of audio objects to an allocated plurality of audio object clusters based on the metadata that indicates spatial position
(Continued)

information and based on the assignments of the audio objects to the categories of rendering metadata.

20 Claims, 6 Drawing Sheets

(56) References Cited

U.S. PATENT DOCUMENTS

| | | | | |
|---|---|---|---|---|
| 8,892,450 | B2 | 11/2014 | Schildbach | |
| 8,902,224 | B2 | 12/2014 | Wyeld | |
| 9,031,243 | B2 | 5/2015 | Leboeuf | |
| 9,479,886 | B2 | 10/2016 | Xiang | |
| 9,489,954 | B2 | 11/2016 | Hooks | |
| 9,728,181 | B2 | 8/2017 | Jot | |
| 9,805,725 | B2 | 10/2017 | Crockett | |
| 10,257,638 | B2 | 4/2019 | Van Brandenburg | |
| 10,277,997 | B2 | 4/2019 | Chen | |
| 10,278,000 | B2 | 4/2019 | Breebaart | |
| 10,638,246 | B2 | 4/2020 | Chen | |
| 2014/0025386 | A1 | 1/2014 | Xiang | |
| 2015/0235645 | A1* | 8/2015 | Hooks | G10L 19/008 704/500 |
| 2016/0125887 | A1 | 5/2016 | Purnhagen | |
| 2016/0337776 | A1 | 11/2016 | Breebaart | |
| 2017/0180905 | A1* | 6/2017 | Purnhagen | G10L 19/008 |
| 2017/0339506 | A1 | 11/2017 | Chen | |
| 2018/0098173 | A1 | 4/2018 | Van Brandenburg | |
| 2019/0278504 | A1 | 9/2019 | Matsui | |

FOREIGN PATENT DOCUMENTS

| | | | | |
|---|---|---|---|---|
| JP | 2016509249 A | 3/2016 | | |
| JP | 2016522911 A | 8/2016 | | |
| JP | 2017535905 A | 11/2017 | | |
| KR | 101507901 B1 | 4/2015 | | |
| KR | 20170081688 A | 7/2017 | | |
| RU | 2019100704 A | 3/2019 | | |
| WO | WO-2014015299 A1 * | 1/2014 | | G10L 19/008 |
| WO | 2014099285 A1 | 6/2014 | | |
| WO | 2014187990 A1 | 11/2014 | | |
| WO | 2015017037 A1 | 2/2015 | | |
| WO | 2016094674 A1 | 6/2016 | | |
| WO | 2017085562 A2 | 5/2017 | | |
| WO | 2018017394 A1 | 1/2018 | | |
| WO | 2018026828 A1 | 2/2018 | | |
| WO | 2020105423 A1 | 5/2020 | | |

* cited by examiner

CLUSTERING AUDIO OBJECTS

CROSS-REFERENCE TO RELATED APPLICATIONS

This application is a U.S. National Stage application under U.S.C. 371 of International Application No. PCT/US22/16388, filed on 15 Feb. 2022, which claims priority to International Patent Application No. PCT/CN2021/077110, filed 20 Feb. 2021; U.S. Provisional Patent Application No. 63/165,220, filed 24 Mar. 2021; U.S. Provisional Patent Application No. 63/202,227, filed 2 Jun. 2021, and European Patent Application No. 21178179.4, filed 8 Jun. 2021, which are hereby incorporated by reference.

TECHNICAL FIELD

This disclosure pertains to systems, methods, and media for clustering audio objects.

BACKGROUND

Audio content presentation devices that are capable of presenting spatially-positioned audio content are becoming increasingly popular. For example, such audio content presentation devices may be capable of presenting audio content that is perceived to be at various spatial positions within a three-dimensional environment of a listener. Although some existing audio content presentation methods and devices provide acceptable performance under some conditions, improved methods and devices may be desirable.

NOTATION AND NOMENCLATURE

Throughout this disclosure, including in the claims, the terms “speaker,” “loudspeaker” and “audio reproduction transducer” are used synonymously to denote any sound-emitting transducer (or set of transducers). A typical set of headphones includes two speakers. A speaker may be implemented to include multiple transducers (e.g., a woofer and a tweeter), which may be driven by a single, common speaker feed or multiple speaker feeds. In some examples, the speaker feed(s) may undergo different processing in different circuitry branches coupled to the different transducers.

Throughout this disclosure, including in the claims, the expression performing an operation “on” a signal or data (e.g., filtering, scaling, transforming, or applying gain to, the signal or data) is used in a broad sense to denote performing the operation directly on the signal or data, or on a processed version of the signal or data (e.g., on a version of the signal that has undergone preliminary filtering or pre-processing prior to performance of the operation thereon).

Throughout this disclosure including in the claims, the expression “system” is used in a broad sense to denote a device, system, or subsystem. For example, a subsystem that implements a decoder may be referred to as a decoder system, and a system including such a subsystem (e.g., a system that generates X output signals in response to multiple inputs, in which the subsystem generates M of the inputs and the other X−M inputs are received from an external source) may also be referred to as a decoder system.

Throughout this disclosure including in the claims, the term “processor” is used in a broad sense to denote a system or device programmable or otherwise configurable (e.g., with software or firmware) to perform operations on data (e.g., audio, or video or other image data). Examples of processors include a field-programmable gate array (or other configurable integrated circuit or chip set), a digital signal processor programmed and/or otherwise configured to perform pipelined processing on audio or other sound data, a programmable general purpose processor or computer, and a programmable microprocessor chip or chip set.

Throughout this disclosure including in the claims, the term “cluster” or “clusters’ is used to mean a cluster of audio objects. The terms “cluster” and “audio object cluster” should be understood to be synonymous and used interchangeably. A cluster of audio objects is a combination of audio objects having one or more similar attributes, such as audio objects having a similar spatial position and/or similar rendering metadata. In some instances, an audio object may be assigned to a single cluster, whereas in other instances an audio object may be assigned to multiple clusters.

SUMMARY

At least some aspects of the present disclosure may be implemented via methods. Some methods may involve identifying a plurality of audio objects, wherein each audio object of the plurality of audio objects is associated with respective metadata that indicates respective spatial position information and respective rendering metadata. Some methods may involve assigning audio objects of the plurality of audio objects to categories of rendering metadata of a plurality of categories of rendering metadata, wherein at least one category of rendering metadata comprises a plurality of types of rendering metadata to be preserved. Some methods may involve determining an allocation of a plurality of audio object clusters to each category of rendering metadata, wherein an audio object cluster comprises one or more audio objects of the plurality of audio objects having similar attributes. Some methods may involve rendering audio objects of the plurality of audio objects to an allocated plurality of audio object clusters based on the metadata that indicates spatial position information and based on the assignments of the audio objects to the categories of rendering metadata.

In some examples, the categories of rendering metadata comprise a bypass mode category and a virtualization category. In some examples, the plurality of types of rendering metadata included in the virtualization category comprise a plurality of types of virtualization, each representing a distance from a head center to the audio object.

In some examples, the categories of rendering metadata comprise one of a zone category or a snap category.

In some examples, an audio object assigned to a first category of rendering metadata is inhibited from being assigned to an audio object cluster of the plurality of audio object clusters allocated to a second category of rendering metadata.

In some examples, determining the allocation of the plurality of audio object clusters to each category of rendering metadata involves: (i) determining an initial allocation of an initial plurality of audio object clusters to each category of rendering metadata; (ii) assigning the audio objects to the initial plurality of audio object clusters based on the metadata that indicates spatial position information and based on the assignments of the audio objects to the categories of rendering metadata; (iii) for each category of rendering metadata, determining a category cost of the assignment of the audio objects to the initial plurality of audio object clusters; (iv) determining an updated allocation of the initial plurality of audio object clusters to each category of rendering metadata based at least in part on the category cost for each category of rendering metadata; and (iv) repeating (ii)-(iv) until a stopping criterion is reached. In some examples, determining the category cost of the assignment of the audio objects to the initial plurality of audio object clusters is based on positions of audio object clusters allocated to the category of rendering metadata and positions of audio objects assigned to the audio object clusters allocated to the category of rendering metadata. In some examples, the category cost is based on a left versus right placement of an audio object relative to a left versus right placement of an audio object cluster the audio object has been assigned to. In some examples, determining the category cost of the assignment of the audio objects to the initial plurality of audio object clusters is based on loudness of the audio objects. In some examples, determining the category cost of the assignment of the audio objects to the initial plurality of audio object clusters is based on a distance of an audio object to an audio object cluster the audio object has been assigned to. In some examples, determining the category cost of the assignment of the audio objects to the initial plurality of audio object clusters is based on a similarity of a type of rendering metadata of an audio object to a type of rendering metadata of an audio object cluster the audio object has been assigned to. In some examples, methods may involve determining a global cost based on the category cost for each category of rendering metadata, wherein the updated allocation of the initial plurality of audio object clusters is based on the global cost. In some examples, determining the updated allocation comprises changing a number of audio object clusters allocated to at least one category of rendering metadata of the plurality of categories of rendering metadata. In some examples, methods may further involve determining a global cost based on the category cost for each category of rendering metadata, wherein the number of audio object clusters is determined based on the global cost. In some examples, determining the number of audio object clusters comprises minimizing the global cost subject to a constraint on the number of audio object clusters that indicates a maximum number of audio object clusters that can be added.

In some examples, rendering audio objects of the plurality of audio objects to the allocated plurality of audio object clusters comprises determining an object-to-cluster gain for each audio object of the plurality of audio objects when rendered to one or more audio object clusters allocated to a category of rendering metadata to which the audio object is assigned. In some examples, object-to-cluster gains for audio objects assigned to a first category of the plurality of categories of rendering metadata are determined separately from object-to-cluster gains for audio objects assigned to a second category of the plurality of categories of rendering metadata. In some examples, object-to-cluster gains for audio objects assigned to a first category of the plurality of categories of rendering metadata are determined jointly with object-to-cluster gains for audio objects assigned to a second category of the plurality of categories of rendering metadata.

Some or all of the operations, functions and/or methods described herein may be performed by one or more devices according to instructions (e.g., software) stored on one or more non-transitory media. Such non-transitory media may include memory devices such as those described herein, including but not limited to random access memory (RAM) devices, read-only memory (ROM) devices, etc. Accordingly, some innovative aspects of the subject matter described in this disclosure can be implemented via one or more non-transitory media having software stored thereon.

At least some aspects of the present disclosure may be implemented via an apparatus. For example, one or more devices may be capable of performing, at least in part, the methods disclosed herein. In some implementations, an apparatus is, or includes, an audio processing system having an interface system and a control system. The control system may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof.

The present disclosure provides various technical advantages. For example, audio objects, which may be associated with spatial position information as well as rendering metadata that indicates a manner in which an audio object is to be rendered, may be clustered in a manner that preserves rendering metadata across different categories of rendering metadata. In some cases, rendering metadata may not be preserved when clustering audio objects within the same category of rendering metadata. By clustering audio objects using a hybrid approach of preserving rendering metadata based on category of rendering metadata, the techniques described herein allow an audio signal with clustered audio objects to be generated that lessens spatial distortion when rendering the audio signal, as well as reducing a bandwidth required to transmit such an audio signal. Such an audio signal may advantageously be more faithful to an intent of a creator of the audio content associated with the audio signal.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION OF EMBODIMENTS

Figure 1A:
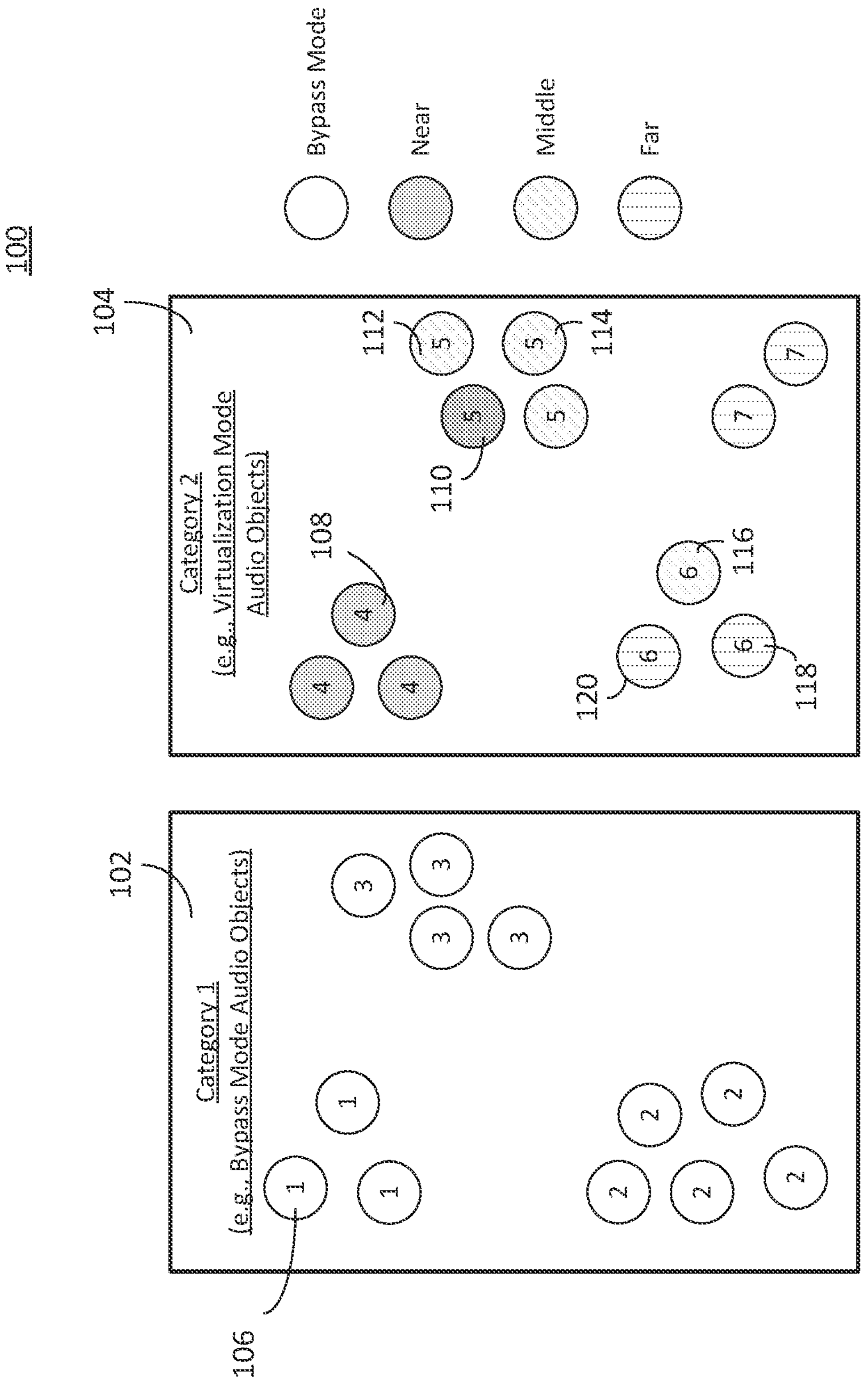
FIGS. 1A and 1B illustrate representations of example clusters of audio objects based on rendering metadata and spatial positioning metadata in accordance with some implementations.

Audio content presentation devices (whether presented via loudspeakers or headphones) that are capable of presenting spatially-positioned audio content are becoming increasingly popular. For example, such audio content presentation devices may be capable of presenting audio content that is perceived to be at various spatial positions within a three-dimensional environment of a listener. Such audio content may be encoded in an audio format that includes "audio beds," which include audio content that is to be rendered at a fixed spatial position, and "audio objects," which include audio content that may rendered at varying spatial positions and/or for varying durations of time. For example, an audio object may represent a sound effect associated with a moving object (e.g., a buzzing insect, a moving vehicle, or the like), music from a moving instrument (e.g., a moving instrument in a marching band, or the like), or other audio content that may move in position.

Each audio object may be associated with metadata that describes how the audio object is to be rendered (generally referred to herein as "rendering metadata") and/or a spatial position at which the audio object is to be perceived when rendered (generally referred to herein as "spatial position metadata"). For example, spatial position metadata may indicate a position within three-dimensional (3D) space that an audio object is to be perceived at by a listener when rendered. Spatial position metadata may specify an azimuthal position of the audio object and/or an elevational position of the audio object. As another example, rendering metadata may indicate a manner in which the audio object is to be rendered. It should be noted that example types of rendering metadata for a headphone rendering mode may be different than types of rendering metadata for a speaker rendering mode. In some implementations, rendering metadata may be associated with a category of rendering metadata. For example, rendering metadata associated with a headphone rendering mode may be associated with a first category corresponding to a "bypass mode" in which room virtualization is not applied when rendering audio objects assigned to the first category, and a second category corresponding to a "room virtualization" category in which room virtualization techniques are applied when rendering audio objects assigned to the second category. Continuing further with this example, in some embodiments, a category of rendering metadata may have types of rendering metadata within the category. As a more particular example, rendering metadata associated with a "room virtualization" category of rendering metadata may have multiple types of rendering metadata, such as "near," "middle," and "far," which may each indicate a relative distance from a listener's head to a position within the room at which the audio object is to be rendered. As another example, rendering metadata associated with a speaker rendering mode may be associated with a first category of rendering metadata corresponding to a "snap" mode that indicates that the audio object is to be rendered to a particular speaker to achieve a point-source type rendering, and a second category of rendering metadata corresponding to a "zone-mask" mode that indicates that the audio object is to not be rendered to particular speakers included in a particular group of speakers (generally referred to herein as a "zone mask"). As a more particular example, in some embodiments, a "snap" category of rendering metadata may include types of rendering metadata corresponding to particular speakers. In some embodiments, a "snap" category of rendering metadata may include a binary value, where, in response to the rendering metadata being "1," or "yes" (indicating that "snap" is to be enabled), the audio object may be rendered by the closest speaker. As another more particular example, a "zone-mask" category of rendering metadata may include types of rendering metadata that correspond to different groupings of speakers that are not to be used to render the audio object (e.g., "left side surround and right side surround," "left and right," or the like). In some embodiments, a "zone-mask" category of rendering metadata may indicate one or more speakers to which the audio object is to be rendered (e.g., "front," "back," or the like), and other speakers will be excluded or inhibited from rendering the audio object.

Metadata associated with an audio object, whether spatial position metadata or rendering metadata, may be specified by an audio content creator, and may therefore represent the artistic wishes of the audio content creator. Accordingly, it may be important to preserve the spatial position metadata and/or the rendering metadata in order to faithfully represent the artistic wishes of the audio content creator. However, in some cases, such as in a soundtrack for a movie or television show, audio content may include tens or hundreds of audio object. Accordingly, audio content that is formatted to include audio objects may be large in size and quite complex. Accordingly, transmitting such audio content for rendering may be difficult and may require substantial bandwidth. The increased bandwidth requirements may be particularly problematic for viewers or listeners of such audio content at home, who may be more constrained by bandwidth considerations when viewing or listening to such audio content at home compared to a movie theatre or the like.

To reduce audio content complexity, audio objects may be clustered based at least in part on spatial positioning metadata such that audio objects that are relatively close in position (e.g., azimuthal position and/or elevational position) are assigned to a same audio object cluster. The audio object cluster may then be transmitted and/or rendered. By rendering audio objects assigned to a same audio object cluster using aggregate metadata associated with the audio object cluster, spatial complexity may be reduced thereby reducing bandwidth for transmitting and/or rendering an audio signal.

However, clustering audio objects without regard for the rendering metadata, and the categories of rendering metadata each audio object has been assigned to, may create perceptual discontinuities. For example, assigning an audio object assigned to a "bypass mode" category of rendering metadata to a cluster associated with a "room virtualization" category of rendering metadata may cause perceptual distortions, even if the audio object and other audio objects assigned to the cluster are associated with similar azimuthal and/or elevational spatial positions. In particular, the audio object, by being assigned to a cluster associated with the "room virtualization" category of rendering metadata, may undergo transformation using a head-related transfer function (HRTF) to simulate propagation paths from a source to a listener's ears. The HRTF transformation may distort a perceptual quality of the audio object, e.g., by introducing a timbre change associated with rendering of the audio object, and/or by introducing temporal discontinuities in instances in which a few frames of audio content are assigned to a different category. Moreover, because the first audio object was assigned to a "bypass mode" category by an audio content creator, rendering the first audio object using an HRTF that is to be applied to audio objects assigned to "room virtualization" categories of audio objects may cause the first audio object to be rendered in a manner that is not faithful to the intent of the audio content creator.

Clustering audio objects in a manner that strictly preserves categories of rendering metadata and/or that strictly preserves types of rendering metadata within a particular category of rendering metadata may also have consequences. For example, clustering audio objects with strictly preserved rendering metadata may require a relatively high number of clusters, which increases a complexity of the audio signal and may require a higher bandwidth for audio signal encoding and transmission. Alternatively, clustering audio objects with strictly preserved rendering metadata and with a limited number of clusters may cause spatial distortion, by causing two audio objects with the same rendering metadata but positioned relatively far from each other to be rendered to the same cluster.

The techniques, systems, methods, and media described herein describe assigning and/or generating audio object clusters that preserves categories of rendering metadata in some instances while allowing audio objects associated with a particular category of rendering metadata or type of rendering metadata within a category of rendering metadata to be clustered with audio objects associated with a different category of rendering metadata or a different type of rendering metadata in other instances. The techniques, systems, methods, and media described herein may allow spatial complexity to be reduced by clustering audio objects, thereby reducing bandwidth required to transmit and/or render such audio objects while also improving perceptual quality of rendered audio objects by preserving rendering metadata in some instances and not preserving rendering metadata in other instances. In particular, by allowing flexibility in use of rendering metadata category or type when assigning audio objects to audio object clusters, spatial distortion produced by strict rendering metadata constraints during clustering may be reduced or eliminated while still achieving a reduction in audio content complexity that yields a reduction in bandwidth required to transmit such audio content. An audio object cluster may be considered as being associated with audio objects having similar attributes, where the similar attributes may include similar spatial positions and/or similar rendering metadata (e.g., the same rendering metadata category, the same rendering metadata type, or the like). Similarity in spatial positions may be determined based on a distance between an audio object and a centroid of the cluster the audio object is allocated to (e.g., a Euclidean distance, and/or any other suitable distance metric). In embodiments in which audio objects may be rendered to multiple audio object clusters, an audio object may be associated with multiple weights, each corresponding to an audio object cluster, where a weight indicates a degree to which an audio object is rendered to a particular cluster. Continuing with this example, in an instance in which an audio object is relatively far from a particular audio object cluster (e.g., a spatial position associated with the audio object is relatively far from a centroid associated with the audio object cluster), a weight associated with the audio object cluster may be relatively small (e.g., close to or equal to 0). In some embodiments, two audio objects may be considered to have similar attributes based on a similarity of weights associated with each of the two audio objects indicating a degree to which each audio object is rendered to particular audio object clusters.

In some implementations, audio object clusters may be generated such that audio objects assigned to a particular category of rendering metadata (e.g., "bypass mode") are inhibited from being assigned to clusters with audio objects assigned to other categories of rendering metadata (e.g., "virtualization mode"). In some such implementations, audio objects within a particular category of rendering metadata may be assigned to clusters with audio objects having a same type of rendering metadata within the particular category and/or with audio objects having a different type of rendering metadata within the particular category. For example, in some implementations, a first audio object assigned to a "virtualization mode" category and having a type of rendering metadata of "near" (e.g., indicating that the first audio object is to be rendered as relatively near a listener's head) may be assigned to a cluster that includes a second audio object assigned to the "virtualization mode" category and having a type of rendering metadata of "middle" (e.g., indicating that the second audio object is to be rendered as within a middle range of distance from a source to the listener's head). Continuing with this example, in some implementations, the first audio object may be inhibited from being assigned to a cluster that includes a third audio object assigned to the "virtualization mode" category and having a type of rendering metadata of "far" (e.g., indicating that the third audio object is to be rendered as relatively far from the listener's head).

FIG. 1A shows an example 100 of a representation of a clustering of audio objects in which audio objects assigned to a particular category of rendering metadata are not permitted to be clustered with audio objects assigned to other categories of rendering metadata.

In example 100, there are two categories of rendering metadata. Category 102 (denoted as "Category 1" in FIG. 1A) corresponds to audio objects associated with "bypass mode" rendering metadata. Category 104 (denoted as "Category 2" in FIG. 1A) corresponds to audio objects associated with "virtualization mode" rendering metadata. A "virtualization mode" category of rendering metadata may have various potential types of rendering metadata, such as "near," "middle," and/or "far" distances from a head of a listener. Accordingly, an audio object assigned to the "virtualization mode" category of rendering metadata may have a type of rendering metadata that is selected from one of "near," "middle," or "far," as shown in FIG. 1A and as depicted within FIG. 1A by a type of shading applied to each audio object.

FIG. 1A shows a group of audio objects (e.g., audio object 106) that have been clustered based on spatial position metadata associated with the audio objects and based on categories of rendering metadata associated with the audio objects. The assigned cluster is indicated as a numeral within the circle depicting each audio object. For example, audio object 106 has been assigned to cluster "1," as shown in FIG. 1A. As another example, within category 104, audio object 108 has been assigned to cluster "4."

In example 100 of FIG. 1A, category of rendering metadata is strictly preserved in generation of audio object clusters. For example, audio objects assigned to the "bypass mode" category of rendering metadata are inhibited from being assigned to clusters allocated to the "virtualization mode" category of rendering metadata. Similarly, audio objects assigned to the "virtualization mode" category of rendering metadata are inhibited from assigned to clusters allocated to the "bypass mode" category of rendering metadata.

In the example 100 of FIG. 1A, audio objects assigned to a particular category of rendering metadata may be clustered with other audio objects assigned to the same category of rendering metadata but having a different type of rendering metadata within the category. For example, within category 104, an audio object 110 associated with a "near" type of rendering metadata within the "virtualization mode" category may be clustered with audio objects 112 and 114, each associated with a "middle" type of rendering metadata within the "virtualization mode" category. As another example, within category 104, an audio object 116 associated with a "middle" type of rendering metadata within the "virtualization mode" category of rendering metadata may be clustered with audio objects 118 and 120, each associated with a "far" type of rendering metadata within the "virtualization mode" category of rendering metadata.

It should be noted that the clustering of audio objects depicted in example 100 may be a result of a clustering algorithm or technique. For example, the clustering of audio objects depicted in example 100 may be generated using the techniques shown in and described below in connection with process 200 of FIG. 2. In some implementations, a number of audio object clusters allocated to each category shown in FIG. 1A and/or a spatial centroid position of each cluster may be determined using an optimization algorithm or technique. For example, the allocation of audio object clusters may be iteratively determined to generate an optimal allocation using the techniques shown in and described below in connection with process 300 of FIG. 3. Additionally, in some implementations, assignment of audio objects to particular clusters may be accomplished by determining object-to-cluster gains that describe a ratio or gain of the audio object when rendered to a particular cluster, as described below in connection with process 400 of FIG. 4.

Figure 1B:
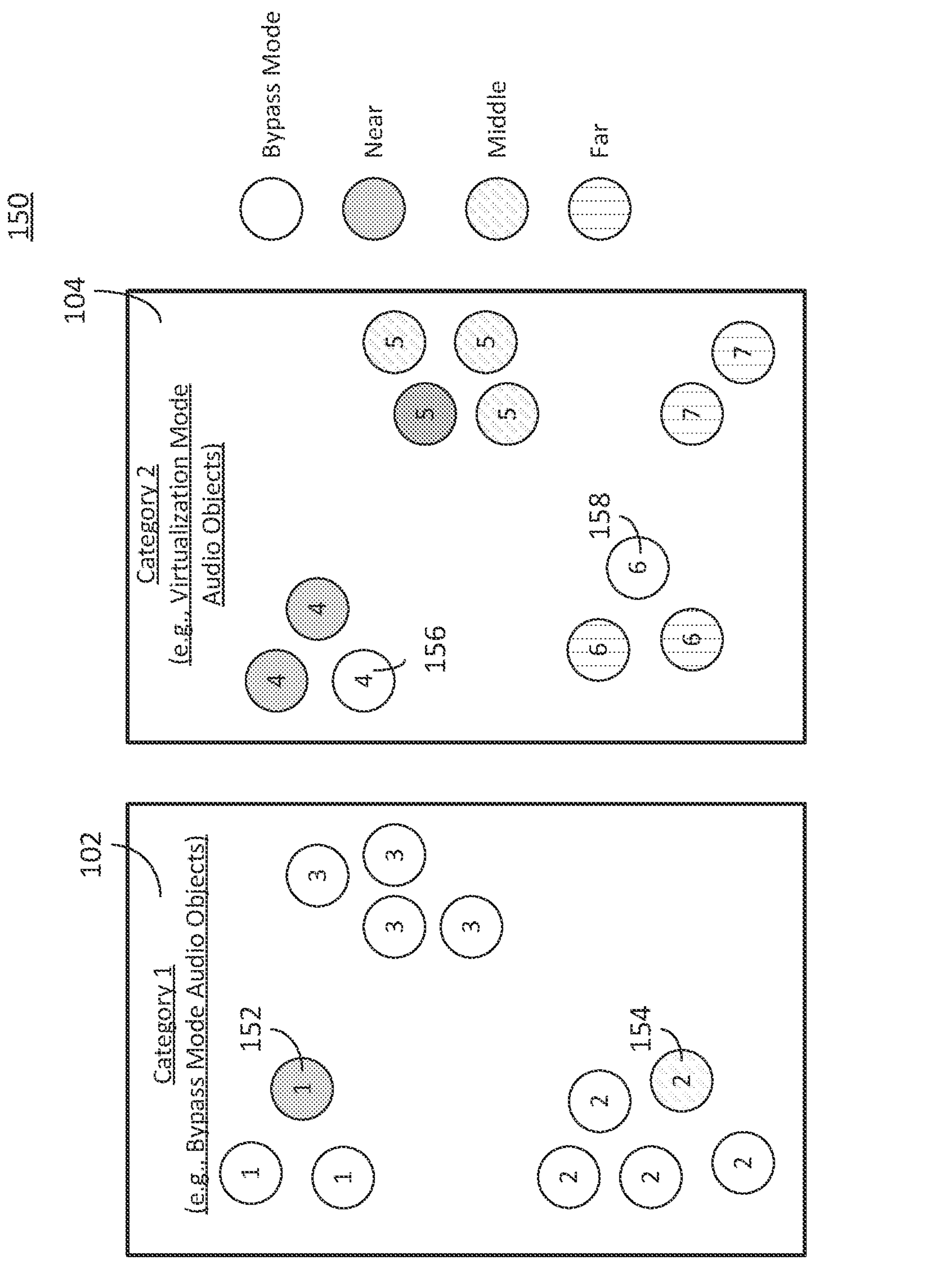

By contrast, FIG. 1B shows an example 150 of a representation of a clustering of audio objects in which audio objects assigned to a particular category of rendering metadata are permitted to be assigned to clusters allocated to other categories of rendering metadata in some instances.

As illustrated in FIG. 1B, audio objects assigned to a particular category of rendering metadata may be permitted to be assigned to a cluster allocated to a different category of rendering metadata. For example, audio objects 152 and 154, each assigned to a "virtualization mode" category, are assigned to clusters allocated to the "bypass mode" category (e.g., category 102 of FIG. 1B). As another example, audio objects 156 and 158, each assigned to a "bypass mode" category, are assigned to clusters allocated to the "virtualization mode" category (e.g., category 104 of FIG. 1B).

It should be noted that, although FIGS. 1A and 1B show each audio object assigned to a single cluster, an audio object may be assigned or rendered to multiple clusters, as described in below in connection with FIGS. 2 and 4. A degree to which a particular audio object is assigned and/or rendered to a particular cluster is generally referred to herein as an "object-to-cluster gain." For example, for an audio object j and a cluster c, an object-to-cluster gain of 1 indicates that the audio object j is fully assigned or rendered to cluster c. As another example, an object-to-cluster gain of 0.5 indicates that the audio object j is assigned or rendered to cluster c with gain of 0.5, and that a remaining signal associated with audio object j is rendered to other clusters. As yet another example, an object-to-cluster gain of 0 indicates that the audio object j is not assigned or rendered to cluster c.

Figure 2:
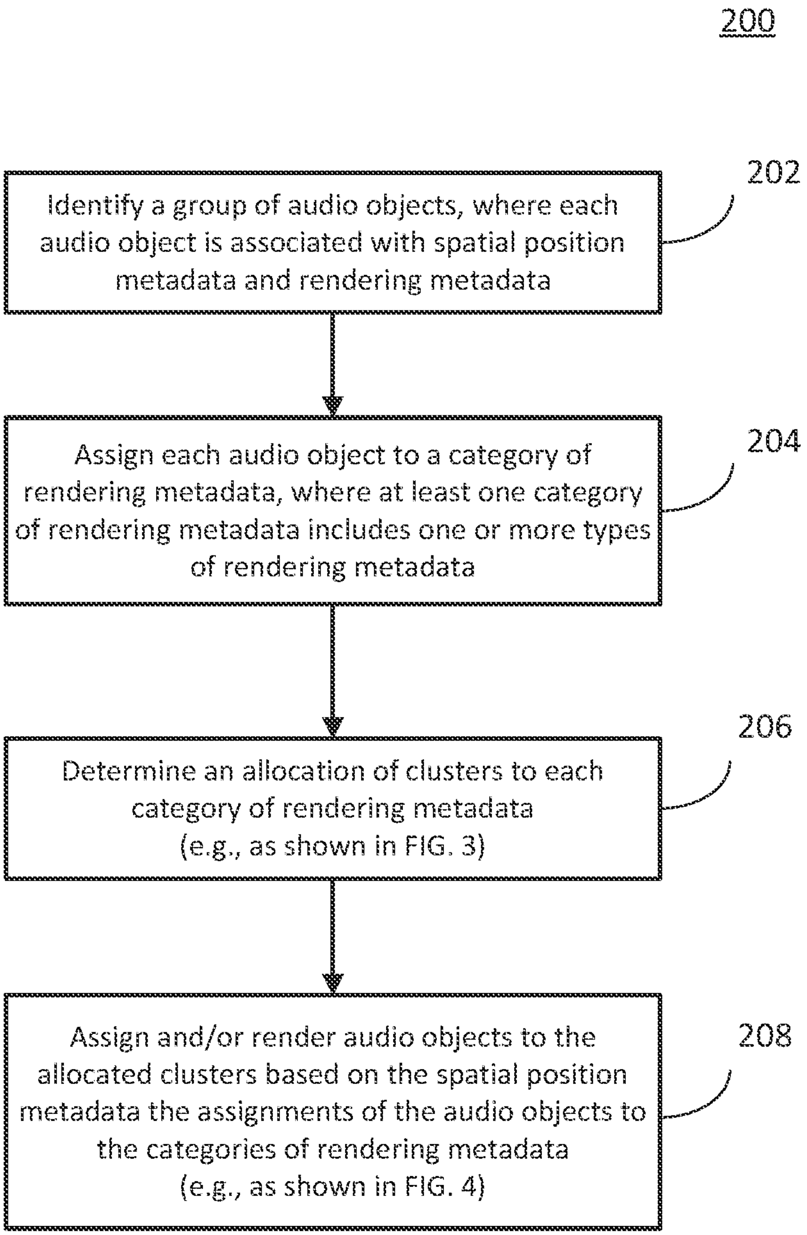
FIG. 2 shows an example of a process for clustering audio objects based on spatial positioning metadata while preserving rendering metadata in accordance with some implementations.

FIG. 2 illustrates an example of a process 200 for allocating clusters to different categories of rendering metadata and assigning audio objects to the allocated clusters in accordance with some embodiments. Process 200 may be performed on various devices, such as a server that encodes an audio signal based on audio objects and associated metadata provided by an audio content creator. It should be noted that process 200 generally describes a process with respect to a single frame of audio content. However, it should be understood that, in some embodiments, the blocks of process 200 may be repeated for one or more other frames of the audio content, for example, to generate a full output audio signal that is a compressed version of an input audio signal. In some implementations, one or more blocks of process 200 may be omitted. Additionally, in some implementations, two or more blocks of process 200 may be performed substantially in parallel. The blocks of process 200 may be performed in any order not limited to the order shown in FIG. 2.

Process 200 can begin at 202 by identifying a group of audio objects, where each audio object is associated with spatial position metadata and with rendering metadata. The audio objects in the group of audio objects may be identified for a particular frame of an input audio signal. The audio objects may be identified by, for example, accessing a list or table associated with the frame of the input audio signal. The spatial position metadata may indicate spatial position information (e.g., a location in 3D space) associated with rendering of an audio object. For example, the spatial position information may indicate an azimuthal and/or elevational position of the audio object. As another example, the spatial position information may indicate a spatial position in Cartesian coordinates (e.g., (x, y, z) coordinates). The rendering metadata may indicate a manner in which an audio object is to be rendered.

At 204, process 200 can assign each audio object to a category of rendering metadata. Example categories of rendering metadata for a headphone rendering mode include a "bypass mode" category of rendering metadata" and a "virtualization mode" category of rendering metadata. Example categories of rendering metadata for a speaker rendering mode include a "snap mode" category of rendering metadata and a "zone-mask" category of rendering metadata. Within a category of rendering metadata, rendering metadata may be associated with a type of rendering metadata.

In some implementations, at least one category of rendering metadata may include one or more (e.g., two, three, five, ten, or the like) types of rendering metadata. Example types of rendering metadata within a "virtualization mode" category of rendering metadata in a headphone rendering mode include "near," "middle," and "far" virtualization. It should be noted that the type of rendering metadata within a "virtualization mode" category of rendering metadata may indicate a particular HRTF that is to be applied to the audio object to produce the virtualization indicated in the rendering metadata. For example, rendering metadata corresponding to "near" virtualization may specify that a first HRTF is to be used, while rendering metadata corresponding to a "middle" virtualization may specify that a second HRTF is to be used. Example types of rendering metadata within a "snap" category of rendering metadata may include a binary value that indicates whether or not snap is to be enabled and/or particular identifiers of speakers to which the audio object is to be rendered (e.g., "left speaker," "right speaker," or any other particular speaker). Example types of rendering metadata within a "zone-mask" category of rendering metadata include "left side surround and right side surround," "left speaker and right speaker," or any other suitable combination of speakers that indicate one or more speakers that are to be included or excluded from rendering the audio object.

At 206, process 200 can determine an allocation of clusters to each category of rendering metadata. Process 200 can determine the allocation of clusters to each category of rendering metadata such that a number of clusters allocated to each category optimally encompasses the audio objects in the group of audio objects identified at block 202 and subject to any suitable constraints. For example, process 200 can determine the allocation of clusters such that a total number of clusters across all categories of rendering metadata is less than or equal to a predetermined maximum number of clusters (generally represented herein as $M_{total}$). In some embodiments, the predetermined maximum number of clusters across all categories of rendering metadata may be determined based on various criteria or requirements, such as a bandwidth required to transmit an encoded audio signal having the predetermined maximum number of clusters.

As another example, process 200 can determine the allocation of clusters by iteratively optimizing the allocation of clusters based at least in part on cost functions associated with audio objects that would be assigned to each cluster. In some embodiments, the cost functions may represent various criteria such as a distance of an audio object assigned to a particular cluster to a centroid of the cluster, a loudness of an audio object when rendered to a particular cluster relative to an intended loudness of the audio object (e.g., as indicated by an audio content creator), or the like. Various criteria that may be incorporated into a cost function are described below in more detail in connection with FIG. 3. In some implementations, the clusters may be allocated subject to an assumption that audio objects assigned to a particular category will not be permitted to be assigned to clusters allocated to a different category. It should be noted that an example of a process for determining an allocation of audio object clusters to each category of rendering metadata is shown in and described below in connection with FIG. 3.

At 208, process 200 can assign and/or render audio objects to the allocated clusters based on the spatial position metadata and the assignments of the audio objects to the categories of rendering metadata. Assigning and/or rendering audio objects to the allocated clusters based on the spatial position metadata may involve assigning the audio objects to clusters based on the spatial position (e.g., elevational and/or azimuthal position, Cartesian coordinate position, etc.) of the audio objects relative to the spatial positions of the allocated clusters. For example, in some embodiments, process 200 can assign and/or render audio objects to the allocated clusters based on the spatial position metadata and based on a centroid of each allocated cluster such that audio objects with similar spatial positions are allocated to the same cluster. In some embodiments, similarity of spatial positions of audio objects may be determined based on a distance between a spatial position indicated in the spatial position metadata associated with the audio object to a centroid of a cluster (e.g., a Euclidean distance, or the like).

Assigning and/or rendering audio objects to the allocated clusters based on the assignments of the audio objects to the categories of rendering metadata may involve preserving the category of rendering metadata by allocating an audio object to a cluster associated with the same category of rendering metadata. For example, in some embodiments, process 200 can assign audio objects to the allocated clusters such that an audio object assigned to a first category of rendering metadata (e.g., "bypass mode") is inhibited from being assigned and/or rendered to a cluster allocated to a second category of rendering metadata (e.g., "virtualization mode"), as shown in and described above in connection with FIG. 1A. In some implementations, assigning and/or rendering audio objects to the allocated clusters based on the assignments of the audio objects to the categories of rendering metadata may involve permitting an audio object to be assigned to a cluster associated with a different category of rendering metadata. For example, in some embodiments, process 200 can assign and/or render audio objects to the allocated audio object clusters such that an audio object assigned to a first category of rendering metadata (e.g., "bypass mode") is permitted to be assigned to an audio object cluster allocated to a second category of rendering metadata (e.g., "virtualization mode"), as shown in and described above in connection with FIG. 1B. By way of example, cross-category assignment of an audio object may be desirable in an instance in which cross-category assignment of the audio object reduces spatial distortion (e.g., due to positions of the audio object clusters relative to positions of the audio objects). It should be noted that cross-category assignment of an audio object may introduce timbre changes in the perceived quality of the audio object when rendered to an audio object cluster associated with a different category of rendering metadata. As another example, in some embodiments, process 200 can assign audio objects such that an audio object associated with a first type of rendering metadata (e.g., "near" virtualization) within a particular category of rendering metadata is permitted to be clustered with other audio objects associated with a second type of rendering metadata (e.g., "middle" virtualization), as shown with respect to category 104 in FIGS. 1A and 1B. It should be noted that an example process for assigning and/or rendering audio objects to allocated audio object clusters subject to various constraints is shown in and described below in connection with FIG. 4.

Assigning and/or rendering an audio object to a particular cluster may include determining an audio object-to-cluster gain that indicates a gain to be applied to the object when rendered as part of the audio object cluster. For a particular audio object j and an audio object cluster c, the audio object-to-cluster gain is generally denoted herein as $\widetilde{g_{j,c}}$. As described above, it should be noted that an audio object j may be rendered to multiple audio object clusters, where the audio object-to-cluster gain for a particular audio object j and for a particular cluster c indicates a gain applied to the audio object when rendering the audio object j as part of cluster c. In some implementations, the gain $\widetilde{g_{j,c}}$ may be within a range of 0 to 1, where the value indicates a ratio of the input audio signal for the audio object j that is to be applied when rendering audio object j to audio object cluster c. In some implementations, the sum of gains for a particular audio object j over all clusters c is 1, indicating that the entirety of the input audio signal associated with the audio object j must be distributed across the clusters.

Figure 3:
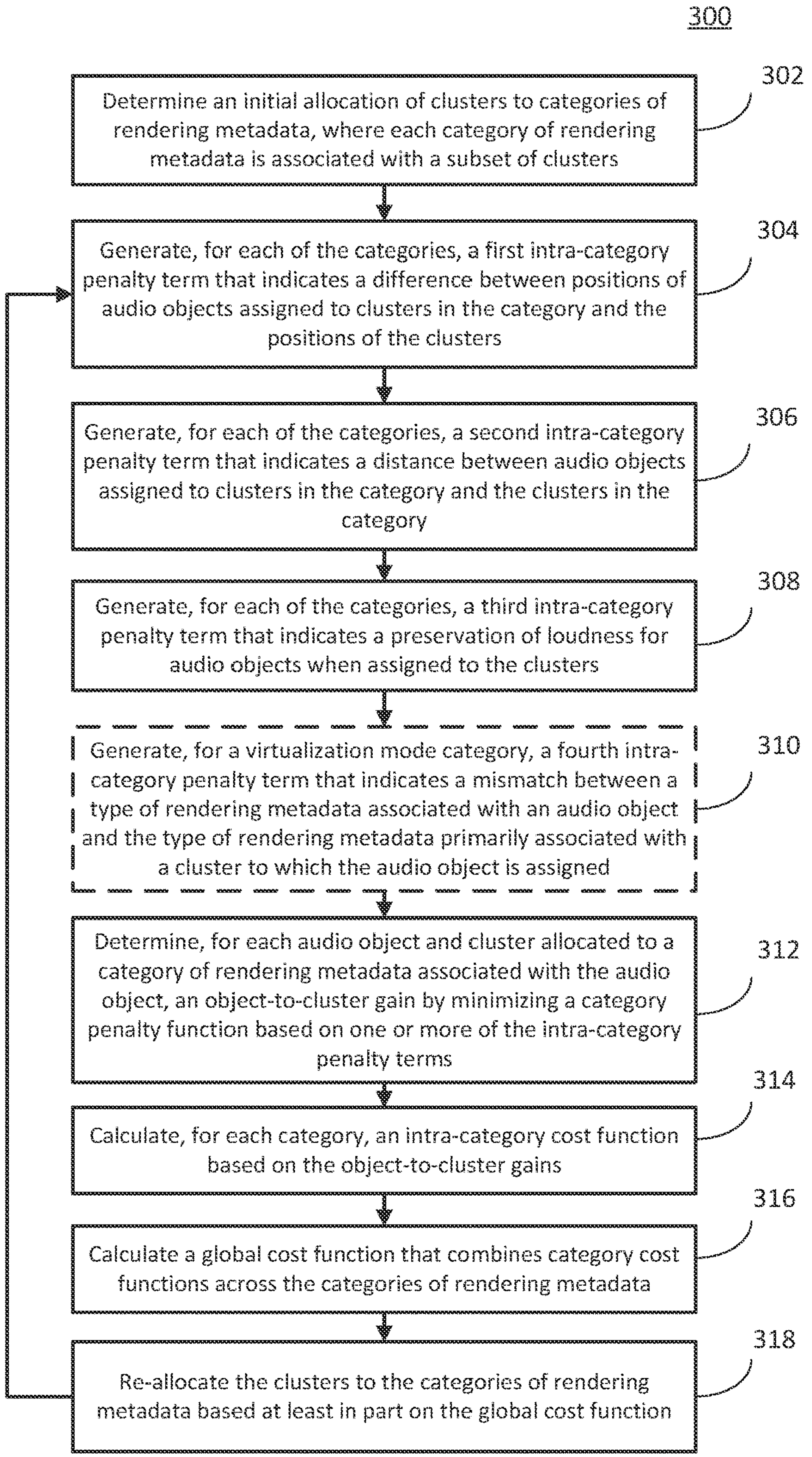
FIG. 3 shows an example of a process for determining allocation of clusters in accordance with some implementations.

FIG. 3 shows an example of a process 300 for generating an allocation of clusters across multiple categories of rendering metadata in accordance with some implementations. Blocks of process 300 may be implemented on any suitable device, such as a server that generates an encoded audio signal based on audio objects included in an input audio signal. It should be noted that process 300 generally describes a process with respect to a single frame of audio content, however, it should be understood that, in some embodiments, the blocks of process 300 may be repeated for one or more other frames of the audio content, for example, to cluster allocations for multiples frames of the audio content. In some implementations, one or more blocks of process 300 may be omitted. Additionally, in some implementations, two or more blocks of process 300 may be performed substantially in parallel. The blocks of process 300 may be performed in any order not limited to the order shown in FIG. 3.

In general, process 300 may begin with an initial allocation of clusters to categories of rendering metadata. In some implementations, process 300 may iteratively loop through blocks 304-318 described below to optimally allocate the clusters to the categories of rendering metadata after beginning with the initial allocation. In some implementations, the allocation may be optimized by minimizing a global cost function that combines cost functions for each category of rendering metadata. A cost function for a category of rendering metadata is generally referred to herein as "an intra-category cost function." An intra-category cost function for a category of rendering metadata may indicate a cost associated with assignment of audio objects to particular clusters allocated to the category of rendering metadata during a current iteration through blocks 304-318. In some implementations, an intra-category cost function may be based on a corresponding intra-category penalty function, as described below in connection with block 314. An intra-category penalty function may depend on one or more intra-category penalty terms, as described below in connection with blocks 304-310. Each intra-category penalty term may depend in turn on an audio object-to-cluster gain for a particular audio object j and cluster c, generally represented herein as $\widetilde{g_{j,c}}$. The object-to-cluster gain may be determined by minimizing a total intra-group penalty function for a particular category of rendering metadata (e.g., as described below in connection with block 312), where the total intra-group penalty function associated with the category is a sum of individual intra-category penalty terms. In other words, process 300 may determine, for a current allocation of clusters to the categories of rendering metadata during a current iteration through blocks 304-318, object-to-cluster gains that minimize intra-category penalty functions for each category of rendering metadata via blocks 304-312 of process 300. The object-to-cluster gains may be used to determine intra-category cost functions for each category of rendering metadata. The intra-category cost functions may then be combined to generate a global cost function. The clusters may then be re-allocated by minimizing the global cost function.

Process 300 can begin at 302 by determining an initial allocation of clusters to categories of rendering metadata, where each category of rendering metadata is allocated a subset of clusters. In some implementations, the clusters can be allocated such that a total number of allocated clusters is less than or equal to a predetermined maximum number of clusters, generally represented herein as $M_{total}$. For example, in an instance in which a first category of rendering metadata is allocated m clusters and in which a second category of rendering metadata is allocated n clusters, $m+n \leq M_{total}$. $M_{total}$ may be determined based on any suitable criteria, such as a total number of audio objects that are to be clustered, an available bandwidth for transmitting an encoded audio signal based on clustered audio objects, or the like. For example, $M_{total}$ may be determined such that a bandwidth for transmitting an encoded audio signal with $M_{total}$ clusters is less than a threshold bandwidth. In some implementations, at least one cluster may be allocated to each category of rendering metadata.

Process 300 may determine a centroid for each initially allocated cluster. For example, in some implementations, the centroid of a cluster may be determined based on the most perceptually salient audio objects assigned to the category of rendering metadata associated with the cluster. As a more particular example, for a first category of rendering metadata (e.g., "bypass mode") for which m clusters are initially allocated, a centroid for each of the m clusters may be determined based at least in part on the perceptual salience of audio objects assigned to the first category of rendering metadata. For example, in some implementations, the m most perceptually salient audio objects assigned the first category of rendering metadata may be identified. The m most perceptually salient audio objects may be identified based on various criteria, such as their loudness, spatial distance from other audio objects assigned to the first category of rendering metadata, differences in timbre associated with the audio objects in the first category of rendering metadata, or the like. In some implementations, perceptual salience of audio objects may be determined based on differences between the audio objects. For example, for audio objects including speech content, two audio objects may be determined to be perceptually salient from each other in instances in which the speech content associated with the two audio objects is in different languages. Centroids of audio object clusters allocated to each category of rendering metadata may be determined in a similar manner.

At 304, process 300 can generate, for each of the categories of rendering metadata, a first intra-category penalty term that indicates a difference between positions of audio objects assigned or rendered to the initially-allocated audio object clusters in the category and the positions (e.g., centroid positions) of the initially-allocated audio object clusters.

The position of an audio object j is generally referred to herein as $p_j$. In some implementations, the position of the audio object j is specified by an audio content creator. The position of a cluster c is generally referred to herein as $p_c$. The position of the cluster c may indicate a position of the centroid of the cluster c, as described above in connection with block 302.

The reconstructed position of the audio object j after being rendered to one or more clusters is generally referred to herein as $\widehat{p_j}$. An example of an equation for calculating $\widehat{p_j}$ is given by:

$$\hat{p}_J = \sum_c \widetilde{g_{j,c}} \, p_c$$

In some implementations, $p_j$, $p_c$, and $\widehat{p_j}$ may be a three-dimensional vector that represents the spatial position of the audio object j when rendered to the one or more clusters. The spatial position may be represented in Cartesian coordinates.

The first intra-category penalty term may indicate an aggregate difference between a position of audio objects when assigned or rendered to one or more clusters and the original position of the audio objects (generally referred to herein as $E_p$). An example equation for determining the first intra-category penalty term that indicates the aggregate difference between the position of audio objects when rendered to one or more clusters and the original positions of the audio objects is given by:

$$E_P = \left\| \hat{p}_j - p_j \sum_c \widetilde{g_{j,c}} \right\|^2 = \left\| \sum_c \widetilde{g_{j,c}} (p_j - p_c) \right\|^2$$

It should be noted that with respect to the first intra-category penalty term described above, and the other intra-category penalty terms described below in connection with blocks 306-310, the intra-category penalty terms are generally described with respect to a single audio object j. The intra-category penalty terms may be calculated for each audio object and a sum may be calculated over all of the audio objects assigned to a particular category of rendering metadata.

At 306, process 300 can generate, for each of the categories of rendering metadata, a second intra-category penalty term that indicates a distance between audio objects assigned or rendered to initially-allocated clusters in the category and the clusters in the category. The second intra-category cost is generally referred to herein as $E_D$. The second intra-category cost $E_D$ may be determined based on a distance measurement between an audio object j and a cluster c the audio object j is assigned to. An example equation for calculating $E_D$ is given by:

$$E_D = \sum_c \widetilde{g_{j,c}^2} [\![ p_j, p_c ]\!]^2$$

In the above equation, $[\![ p_j, p_c ]\!]$ indicates a distance between a position of audio object j and a position of cluster c. Because an audio object positioned in a left zone when rendered to a cluster in a right zone (or vice versa) would generate perceptual artifacts, the distance between the position of audio object j and the position of cluster c is a modified distance that effectively penalizes assignment of audio object j to a cluster c positioned in a different azimuthal hemisphere in binaural rendering. An example equation for calculating the modified distance between an audio object j and a cluster c is given by:

$$[\![ p_j, p_c ]\!] \triangleq \sqrt{(p_j - p_c)^T \Lambda (p_j - p_c)}$$

In the above equation, Λ may represent a 3-by-3 diagonal matrix given by:

$$\Lambda = \begin{bmatrix} \lambda_{xx} & 0 & 0 \\ 0 & 1 & 0 \\ 0 & 0 & 1 \end{bmatrix}$$

In the above, $\lambda_{xx}$ may vary depending on whether the audio object j and the position of the cluster c are in different left/right zones. An example of an equation for determining a value of $\lambda_{xx}$ is given by:

$$\lambda_{xx} = \begin{cases} 1, & \text{if } (x_c - 0.5)(x_j - 0.5) \geq 0 \\ a, & \text{otherwise} \end{cases}$$

In the above, $x_j$ and $x_c$ represent the x-coordinates of the audio object position and the cluster position, respectively. In the above, a is a constant between 0 and 1.

At 308, process 300 can generate, for each of the categories of rendering metadata, a third intra-category penalty term that indicates a preservation of loudness for audio objects when assigned or rendered to various clusters allocated to a category of rendering metadata. In other words, the third intra-category penalty term may indicate a change in energy or amplitude of audio objects when rendered to various clusters, where the energy or amplitude is perceived as loudness by a listener. Accordingly, by minimizing the third intra-category penalty term, perceptual artifacts introduced by rendering an audio object with boosted or attenuated amplitude (and hence, boosted or attenuated loudness) may be minimized. The third intra-category penalty term is generally referred to herein as $E_N$. An example of an equation for calculating the third intra-category penalty term is given by:

$$E_N = \left(1 - \sum_c \widetilde{g_{j,c}}\right)^2$$

In some implementations, at 310 process 300 can generate a fourth intra-category penalty term that indicates a mismatch between a type of rendering metadata associated with audio objects and types of rendering metadata of clusters the audio objects are assigned or rendered to. It should be noted that block 310 may be omitted for categories of rendering metadata that do not include multiple types of rendering metadata within the category. For example, the fourth intra-category penalty term may not be calculated for a "bypass mode" category of rendering metadata.

As an example, in a headphone rendering instance, the fourth intra-category term can indicate a mismatch between a type of virtualization associated with a "virtualization mode" category of rendering metadata (e.g., "near," "middle," or "far") of an audio object and a type of virtualization of one or more clusters the audio object is assigned or rendered to. In effect, the fourth intra-category penalty term can penalize, for example, assignment of an audio object having a particular type of virtualization (e.g., "near," "middle," or "far") to a cluster associated with a different type of virtualization. In some implementations, a penalty amount may depend on a distance between the different types of virtualization. For example, assignment of a first audio object having "near" type of virtualization to a cluster associated with a "far" type of virtualization may be associated with a larger penalty relative to assignment of a second audio object having "near" type of virtualization to a cluster associated with a "middle" type of virtualization. An example of an equation for calculating the fourth intra-category penalty term (generally referred to herein as $E_G$) is:

$$E_G = \sum_c \widetilde{g_{j,c}} U_{HRM(j)HRM(c)}$$

In the equation given above, $U_{HRM(j)HRM(c)}$ may represent an element of a matrix U that defines penalty weights for various combinations of types of virtualization for an audio object j and a cluster c. Each row of matrix U may indicate a type of virtualization associated with an audio object, and each column of matrix U may indicate a type of virtualization associated with a cluster the audio object has been assigned or rendered to. For example, matrix element [HRM (j), HRM(c)] may indicate a penalty weight for a type of virtualization of audio object j indicated by HRM(j) when assigned or rendered to a cluster having c having a type of virtualization HRM(c). In some implementations, matrix U may be symmetric, such than the same penalty weight is used for an audio object having a first type of virtualization when assigned or rendered to a cluster having a second type of virtualization as for an audio object having the type of virtualization when assigned or rendered to a cluster having the first type of virtualization. In some implementations, the diagonal of matrix U may be 0s, indicating a similarity of the type of virtualization associated with the audio object and the type of virtualization associated with the cluster. A specific example of a matrix U that may be used is:

$$U = \begin{bmatrix} 0 & 0.7 & 1 \\ 0.7 & 0 & 0.7 \\ 1 & 0.7 & 0 \end{bmatrix}$$

At 312, process 300 can determine, for each audio object and cluster allocated to a category of rendering metadata associated with the audio object, an object-to-cluster gain. The object-to-cluster gain may be determined by minimizing a category penalty function corresponding to the category of rendering metadata the audio object is associated with. For example, for an audio object associated with a "bypass mode" category of rendering metadata, object-to-cluster gains may be determined for the audio object for one or more clusters allocated to the "bypass mode" category of rendering metadata. As another example, for an audio object associated with a "virtualization mode" category of rendering metadata, object-to-cluster gains may be determined for the audio object for one or more clusters allocated to the "virtualization mode" category of rendering metadata.

The category penalty function for a particular category of rendering metadata may be determined as a sum of (e.g., a weighted sum) of any of the intra-category penalty terms determined at blocks 304-310. For example, in some implementations, a category penalty function for a "virtualization mode" category of rendering metadata may be a weighted sum of the first intra-category penalty term determined at block 304, the second intra-category penalty term determined at block 306, the third intra-category penalty term determined at block 308, and/or the fourth intra-category penalty term determined at block 310. An example of an equation for a category penalty function that is a weighted sum of the intra-category penalty terms determined at blocks 304-310 (and which may be used as a category penalty function for a "virtualization mode" category of rendering metadata in some implementations) is given by:

$$E_{cat1}=w_P E_P+w_D E_D+w_N E_N+w_G E_G$$

In some implementations, a category penalty function that does not include a penalty term that indicates a mismatch between a type of rendering metadata associated with audio objects and types of rendering metadata of clusters the audio objects are assigned or rendered to may be calculated. For example, such a category penalty function may be determined for a "bypass mode" category. In some implementations, such a category penalty function may be a weighted sum of the first intra-category penalty term determined at block 304, the second intra-category penalty term determined at block 306, and/or the third intra-category penalty term determined at 308. An example of an equation for a category penalty function that is a weighted sum of the intra-category penalty terms determined at blocks 304-308 (and which may be used as a category penalty function for a "bypass mode" category of rendering metadata in some implementations) is given by:

$$E_{cat2}=w_P E_P+w_D E_D+w_N E_N$$

It should be noted that in the example given above for calculation of the category penalty function $E_{cat2}$, the category penalty function may be derived from the category penalty function $E_{cat1}$ by setting the fourth intra-category penalty term, $E_G$, to 0.

It should be noted that the example category penalty functions described above are merely illustrative. In some implementations, a category penalty function may be a weighted sum of any suitable intra-category penalty, such as the first intra-category penalty term and the second intra-category penalty term, the second intra-category penalty term and the fourth intra-category penalty term, or the like.

As discussed above, for a given audio object j associated with a particular category of rendering metadata, a vector of object-to-cluster gains indicating gains for the audio object j when rendered to one or more clusters (e.g., indicated as elements of the vector) may be determined by minimizing a category penalty function associated with the category of rendering metadata. For example, for an audio object associated with a "bypass mode" category of rendering metadata, the object-to-cluster gains may be determined by minimizing a "bypass mode" category penalty function (e.g., $E_{cat2}$ in the equation above). The gain vector for audio object j, referred to as $\vec{g}_J$, may be calculated by minimizing the associated category penalty function E. For example, the equation $$\frac{\partial}{\partial g}E=0$$

may be solved, where E is the category cost function for the category of rendering metadata associated with audio object j.

At 314, process 300 can calculate, for each category of rendering metadata, an intra-category cost function based on the object-to-cluster gains of audio objects associated with the category of rendering metadata. In some implementations, an intra-category cost function may be determined based on a loudness of the audio objects within the category of rendering metadata. Additionally, or alternatively, in some implementations, an intra-category cost function may be determined based on a corresponding intra-category penalty function (e.g., $E_{cat1}$ and/or $E_{cat2}$, as described above, or the like). An example equation for calculating an intra-category cost function determined based on an intra-category penalty function E is given by:

$$l=\sum_j N'_j E_j$$

In the equation given above, $N'_j$ indicates a partial loudness of an audio object j. It should be noted that the intra-category cost function may be based at least in part on any combination of: 1) positions of audio object clusters relative to positions of the audio objects allocated to the audio object clusters (e.g., based on the first intra-category penalty term described above at block 304); 2) a left versus right placement of an audio object relative to a left versus right placement of a cluster the audio object has been assigned to (e.g., based on the second intra-category penalty term described above at block 306); 3) a distance of an audio object to a cluster the audio object has been assigned to (e.g., based on the second intra-category penalty term described above at block 306); 4) a loudness of the audio objects (e.g., based on the third intra-category penalty term described above at block 308); and/or 5) a similarity of a type of rendering metadata associated with an audio object to a type of rendering metadata associated with a cluster the audio object has been assigned to (e.g., based on the fourth intra-category penalty term described above at block 310).

In some implementations, an intra-category cost function may be determined as a loudness weighted sum of position differences between an audio object and a cluster. An example equation for calculating an intra-category cost function based on position differences is given by:

$$l=\sum_j N'_j\left(\sum_c \widetilde{g_{j,c}}^2\|p_j-p_c\|^2\right)^{1/2}$$

It should be noted that an intra-category cost function may be determined for each category of rendering metadata. For example, a first intra-category cost function $l_1$ may be determined for a "virtualization mode" category of rendering metadata, and a second intra-category cost function $l_2$ may be determined for a "bypass mode" category of rendering metadata. Similarly, when clustering audio objects for rendering in a speaker rendering mode, intra-category cost functions for a zone-mask category, a snap category, or the like may be calculated.

At 316, process 300 can calculate a global cost function that combines category cost functions across different categories of rendering metadata. For example, the global cost function may combine a first category cost function (e.g., $l_1$ in the example given above) associated with a "virtualization mode" category of rendering metadata and a second category cost function (e.g., $l_2$ in the example given above) associated with a "bypass mode" category of rendering metadata. An example equation for calculating a global cost function (generally referred to herein as $l_{global}$) is given by:

$$l_{global}=al_1+(1-a)l_2$$

In the equation given above, a is a weighting constant that indicates a weight or importance of each category of rendering metadata.

At 318, process 300 can re-allocate the clusters to the categories of rendering metadata based at least in part on the global cost function determined at block 316. For example, in some implementations, process 300 can re-allocate the clusters by selecting a number of clusters for each category that minimizes the global cost function $l_{global}$. As a more particular example, in some implementations, process 300 can select a number of clusters m to be allocated to a first category of rendering metadata and a number of clusters n to be allocated to a second category of rendering metadata.

In some implementations, a number of clusters to be allocated to a particular category of rendering metadata in a current frame may be different that the number of clusters allocated to the particular category of rendering metadata in a previous frame (e.g., as a result of process 300 applied to the previous frame). In some implementations, a change in a number of clusters allocated to a current frame relative to a previous frame may be a result of a different number of audio objects indicated in the current frame relative to the previous frame, as a result of a different number of active audio objects indicated in the current frame relative to the previous frame, and/or as a result of changes in spatial position of active audio objects across frames of the audio signal. As an example, m clusters may be allocated to a first category of rendering metadata in a current frame, where m' clusters were allocated to the first category of rendering metadata in the previous frame. In an instance in which two overlapping signals are to be added in the current frame that include audio objects assigned to different categories of rendering metadata, and in which there are no available free clusters to be allocated to the first category in the current frame, rendering artifacts may be introduced. Adding additional clusters to a particular category of rendering metadata by adding additional clusters that were not previously allocated to any category of rendering metadata may allow audio objects assigned to the particular category of rendering metadata to be more accurately clustered while not introducing rendering artifacts.

In some implementations, given m' clusters allocated to a first category of rendering metadata in a previous frame, n' clusters allocated to a second category of rendering metadata in the previous frame, m clusters allocated to the first category of rendering metadata in the current frame, and n clusters allocated to the second category of rendering metadata in the current frame, an increase in clusters for the first category of rendering metadata and the second category of rendering metadata, respectively, is given by:

$$\Delta m=\max(0,m-m') \text{ and } \Delta n=\max(0,n-n')$$

The number of clusters available for allocation to either the first category of rendering metadata or the second category of rendering metadata may be given by $m_{free}=M_{total}-(m'+n')$. In some implementations, process 300 may re-allocate the clusters to the first category of rendering metadata and the second category of rendering metadata by minimizing $l_{global}(m,n)$ such that $m+n\le M_{total}$ and such that $\Delta m+\Delta n\le m_{free}$. It should be noted that process 300 may re-allocate the clusters subject to this constraint in instances in which cross-category assignment of audio objects (e.g., to a cluster associated with a category of rendering metadata other than a category of rendering metadata associated with the audio object) is not permitted.

By way of example, in an instance in which $M_{total}$ is 21 (e.g., a maximum of 21 clusters may be allocated across all categories of rendering metadata), and in which m' is 11 and n' is 10, $m_{free}$ is 0, because $m'+n'=M_{total}$. Continuing with this example, process 300 may then determine at block 318, that neither m nor n may be increased, because there are no available clusters for allocation. As a particular example, if m were to be set to 13 and n were to be set to 8 (e.g., to satisfy the criteria that $m+n\le M_{total}$), $\Delta m$ is 2 and $\Delta n$ is 0. However, because $\Delta m+\Delta n=2$, which is greater than $m_{free}$ (which is 0), process 300 may determine that 13 is not a valid value of m for the current frame.

It should be noted that although the examples above describe two categories of rendering metadata, the same techniques may be applied for any suitable number of categories of rendering metadata (e.g., three, four, or the like). For example, process 300 may minimize $l_{global}(m_i)$ such that $\Sigma_i m_i\le M_{total}$ and such that $\Sigma_i \Delta m_i\le m_{free}$.

Process 300 can then loop back to block 304. Process 300 can loop through blocks 304-318 until a stopping criteria is reached. Examples of stopping criteria include a determination that a minimum of the global cost function determined at block 316 has been reached, more than a predetermined threshold of iterations have been performed through blocks 304-318, or the like. In some implementations, an allocation determined as a result of looping through blocks 304-318 until the stopping criteria is reached may be referred to as "an optimal allocation."

It should be noted that the blocks of process 300 may be performed to determine an allocation of clusters to categories of rendering metadata for a particular frame of an input audio signal. The blocks of process 300 may be repeated for other frames of the input audio signal to determine the allocation of clusters to categories of rendering metadata for the other frames of the input audio signal. For example, in some implementations, process 300 may repeat the blocks of process 300 for each frame of the input audio signal, for every other frame of the input audio signal, or the like.

Figure 4:
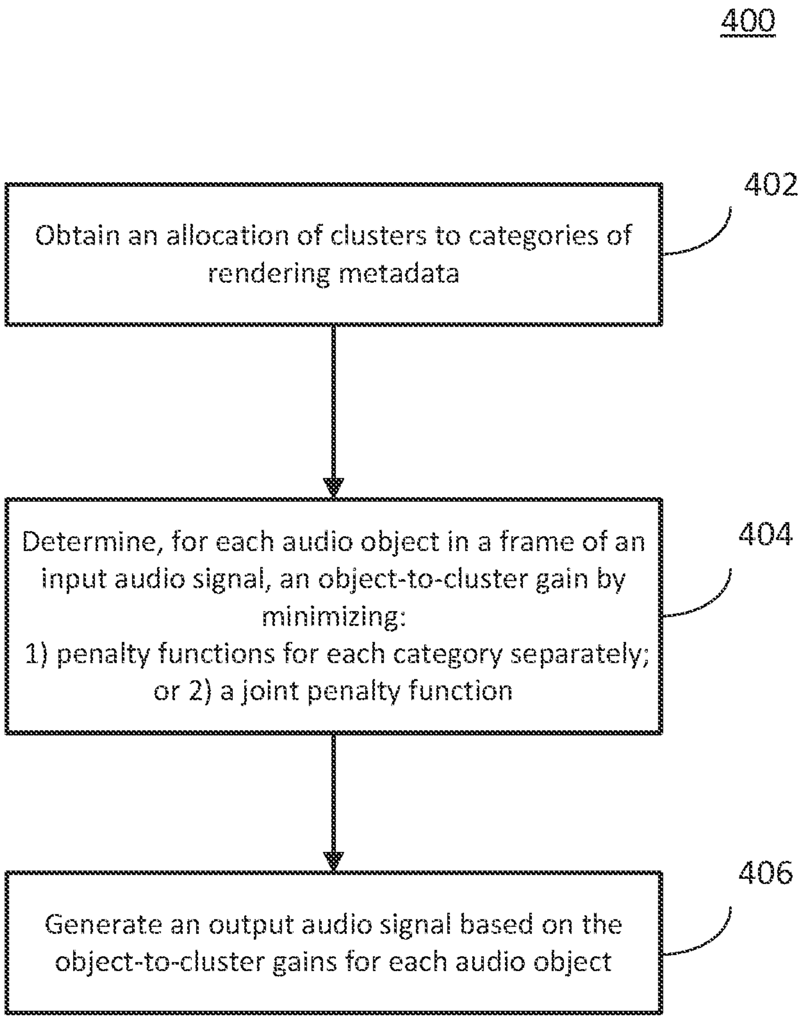
FIG. 4 shows an example of a process for assigning audio objects to allocated clusters in accordance with some implementations.

FIG. 4 shows an example of a process 400 for rendering audio objects to clusters in accordance with some implementations. Blocks of process 400 may be implemented on any suitable device, such as a server that generates an encoded audio signal based on audio objects included in an input audio signal. It should be noted that process 400 generally describes a process with respect to a single frame of audio content, however, it should be understood that, in some embodiments, the blocks of process 400 may be repeated for one or more other frames of the audio content, for example, to generate a full output audio signal that is a compressed version of an input audio signal. In some implementations, one or more blocks of process 400 may be omitted. Additionally, in some implementations, two or more blocks of process 400 may be performed substantially in parallel. The blocks of process 400 may be performed in any order not limited to the order shown in FIG. 4

Process 400 can begin at 402 by obtaining an allocation of clusters to categories of rendering metadata. For example, the allocation may indicate a number of clusters allocated to each category of rendering metadata. As a more particular example, the allocation may indicate a first number of clusters allocated to a first category of rendering metadata (e.g., a "bypass mode" category of rendering metadata) and a second number of clusters allocated to a second category of rendering metadata (e.g., a "virtualization mode" category of rendering metadata). Other categories of rendering metadata may include, in a speaker rendering mode, a "snap" category of rendering metadata, a "zone-mask" category of rendering metadata, or the like. In some implementations, the allocation of clusters may further indicate a centroid position of each cluster. In some implementations, the centroid position of each cluster may be used in calculating penalty functions used to determine object-to-cluster gains at block 404.

In some implementations, the allocation of clusters to the categories of rendering metadata may be a result of an optimization process that determines an optimal allocation of clusters to the categories of rendering metadata subject to various constraints or criteria (e.g., subject to a maximum number of clusters). An example process for determining the allocation of clusters to the categories of rendering metadata is shown in and described above in connection with FIG. 3.

It should be noted that the allocation of clusters to categories of rendering metadata may be specified for individual frames of an input audio signal. For example, the obtained allocation may indicate that m' clusters are to be allocated to a first category of rendering metadata for a first frame of the input audio signal, and that m clusters are to be allocated to the first category of rendering metadata for a second frame of the input audio signal. The first frame of the input audio signal and the second frame of the input audio signal may or may not be successive frames.

At 404, process 400 can determine, for each audio object in a frame of an input audio signal, object-to-cluster gains for clusters allocated to the category of rendering metadata associated with the audio object. For example, in an instance in which an audio object is associated with a "bypass mode" category of rendering metadata and in which m clusters have been allocated to the "bypass mode" category of rendering metadata, process 400 may determine object-to-cluster gains for the audio object when rendered to m clusters allocated to the "bypass mode" category of rendering metadata. It should be noted that an object-to-cluster gains for a particular audio object rendered to a particular cluster may be 0, indicating that the audio object is not assigned to or rendered to that cluster.

In some implementations, process 400 may determine the object-to-cluster gains by minimizing category penalty functions for each category of rendering metadata separately. It should be noted that determining object-to-cluster gains by minimizing penalty functions for each category of rendering metadata separately will inhibit assignment or rendering of an audio object associated with a first category of rendering metadata to a cluster allocated to a second category of rendering metadata, where the first category of rendering metadata is different than the second category of rendering metadata. For example, in such implementations, an audio object associated with a "bypass mode" category of rendering metadata will be inhibited from being assigned and/or rendered to a cluster allocated to a "virtualization mode" category of rendering metadata. An example of such a clustering is shown in and described above in connection with FIG. 1A.

In some implementations, the category penalty functions may be the category penalty functions described in connection with block 312 of FIG. 3. For example, the category penalty functions may be final category penalty functions determined for a final allocation when a stopping criteria is reached in connection with iterations of the blocks of process 300. As a particular example, in an instance in which four intra-category penalty terms are determined (e.g., in a headphone rendering mode instance, and for a "virtualization mode" category of rendering metadata), the category penalty function may be (as described in connection with block 312 of FIG. 3):

$$E=w_P E_P+w_D E_D+w_N E_N+w_G E_G$$

As another particular example, in an instance in which three intra-category penalty terms are determined (e.g., in a headphone rendering mode instance and for a "bypass mode" category of rendering metadata), the category penalty function may be (as described in connection with block 312 of FIG. 3):

$$E=w_P E_P+w_D E_D+w_N E_N$$

By way of example, in a headphone rendering mode instance, process 400 may determine a first set of object-to-cluster gains for a first set of audio objects associated with a "bypass mode" category of rendering metadata by minimizing a first penalty function associated with the "bypass mode" category and for clusters allocated to the "bypass mode" category (e.g., as indicated in the allocation obtained at block 402). Continuing with this example, process 400 may determine a second set of object-to-cluster gains for a second set of audio objects associated with a "virtualization mode" category of rendering metadata by minimizing a second penalty function associated with the "virtualization mode" category and for clusters allocated to the "virtualization mode" category (e.g., as indicated in the allocation obtained at block 402).

Alternatively, in some implementations, process 400 can determine the object-to-cluster gains by minimizing a joint penalty function (e.g., that accounts for all categories of rendering metadata). In such implementations, an audio object associated with a first category of rendering metadata may be assigned or rendered to a cluster allocated to a second category of rendering metadata, where the first category of rendering metadata is different than the second category of rendering metadata. For example, in such implementations, an audio object associated with a "bypass mode" category of rendering metadata may be assigned and/or rendered to a cluster allocated to the "virtualization mode" category of rendering metadata. An example of such a cluster is shown in and described above in connection with FIG. 1B.

An example equation that represents a joint penalty function is:

$$E=w'_P E_P+w'_D E_D+w'_N E_N+w'_G E'_G$$

In the above equation, $E_P$, $E_D$, and $E_N$ represent the first penalty term, the second penalty term, and the third penalty term described in blocks 304, 306, and 308, respectively.

Accordingly, $E_P$, $E_D$, and $E_N$ may be determined using the techniques described above in connection with blocks 304, 306, and 308 of FIG. 3 and considering audio objects and clusters across all categories of rendering metadata. Similar to what is described above in connection with block 312, $w'_P$, $w'_D$, $w'_N$, and $w'_G$ represent relative importance of each penalty term to the overall joint penalty function.

$E'_G$ represents: 1) a penalty associated with a mismatch between assignment or rendering of an audio object associated with a first category to a cluster allocated to a second category of rendering metadata; and 2) a penalty associated with a mismatch between a type of rendering metadata of an audio object and a type of rendering metadata of a cluster the audio object is assigned or rendered to (where the types of rendering metadata of the audio object and the cluster are within the same category of rendering metadata). By way of example, in a headphone rendering instance, $E'_G$ may indicate a penalty for an audio object associated with a "bypass mode" category of rendering metadata being assigned and/or rendered to a "virtualization mode" category of rendering metadata. Continuing with this example, $E'_G$ may additionally or alternatively indicate a penalty for an audio object associated with a "near" type of virtualization being assigned to a cluster that is primarily associated with a "middle" or "far" type of virtualization. An example equation for determining $E'_G$ is given by:

$$E'_G = \sum_c \widetilde{g_{l,c}} U_{mode(j),mode(c)}$$

In the above equation, U represents a matrix that indicates penalties of an audio object j associated with a rendering mode mode(j) being assigned and/or rendered to a cluster associated with a rendering mode mode(c). By way of example, in a headphone rendering instance, examples of modes (e.g., example values of mode(j) and mode(c)) may include "bypass mode," "near" virtualization, "middle" virtualization, and "far" virtualization. In a headphone rendering instance, U may be a 4-by-4 matrix, where rows indicate a mode associated the audio object and columns indicate a mode associated with the cluster the audio object is being assigned or rendered to. As a more particular example, in some implementations, the first three rows and columns of U may correspond to different types of virtualization (e.g., "near," "middle," and "far"), and the fourth row and column of U may correspond to a bypass mode. An example of such a matrix U is:

$$U = \begin{bmatrix} 0 & 0.3 & 0.7 & 1 \\ 0.3 & 0 & 0.3 & 1 \\ 0.7 & 0.3 & 0 & 1 \\ 1 & 1 & 1 & 0 \end{bmatrix}$$

As illustrated in the example U matrix above, an audio object associated with a "bypass mode" category of rendering metadata may be heavily penalized when assigned to a cluster allocated to a "virtualization mode" category of rendering metadata (as indicated by the 1s in the last row of U). Similarly, audio objects associated with any type of "virtualization mode" category of rendering metadata (e.g., any of "near," middle," and/or "far" types of virtualization) may be heavily penalized when assigned to a cluster allocated to a "bypass mode" category of rendering metadata (as indicated by the 1s in the last column of U). In other words, cross-category assignment or rendering of audio objects is relatively more penalized than assignment or rendering of audio objects to other types of rendering metadata within the same category of rendering metadata. By way of example, an audio object associated with a "near" type of virtualization may be assigned to a cluster associated with a "middle" type of virtualization with penalty 0.3, assigned to a cluster associated with a "far" type of virtualization with penalty 0.7, and assigned to a cross-category cluster associated with "bypass mode" rendering metadata with penalty 1.

At 406, process 400 may generate an output audio signal based on the object-to-cluster gains for each audio object (e.g., as determined at block 404). The output audio signal may comprise each audio object assigned or rendered to one or more clusters in accordance with the object-to-cluster gains determined for each audio object. An example equation for generation of an output audio signal for a particular cluster c (generally referred to herein as $I_{out,c}$) is:

$$I_{out,c} = \sum_j \widetilde{g_{l,c}} I_{in,j}$$

As indicated in the equation above, j audio object clusters indicated in an input audio signal $I_{in,j}$ are iterated over, and each is rendered to one or more clusters c based on the object-to-cluster gain $\widetilde{g_{l,c}}$.

It should be noted that the blocks of process 400 may be repeated for one or more other frames of the input audio signal such that audio objects indicated in the one or more other frames of the input audio signal are assigned or rendered to various clusters to generate a full output audio signal that comprises multiple frames of the input audio signal (e.g., all of the frames of the input audio signal). In some implementations, the full output audio signal may be saved, transmitted to a device (e.g., a user device, such as a mobile device, a television, speakers, or the like) for rendering, or the like.

Figure 5:
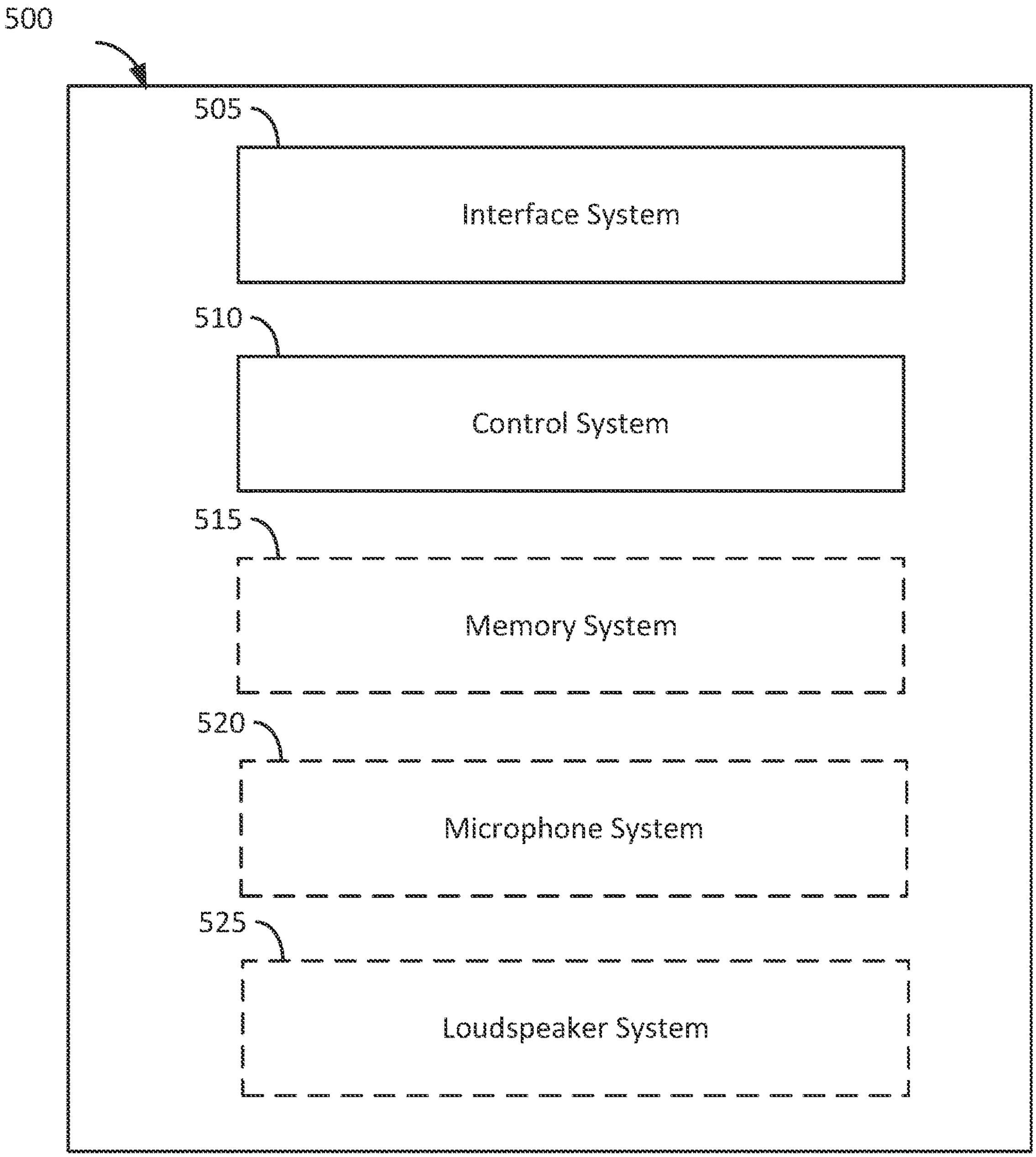
FIG. 5 shows a block diagram that illustrates examples of components of an apparatus capable of implementing various aspects of this disclosure.

FIG. 5 is a block diagram that shows examples of components of an apparatus capable of implementing various aspects of this disclosure. As with other figures provided herein, the types and numbers of elements shown in FIG. 5 are merely provided by way of example. Other implementations may include more, fewer and/or different types and numbers of elements. According to some examples, the apparatus 500 may be configured for performing at least some of the methods disclosed herein. In some implementations, the apparatus 500 may be, or may include, a television, one or more components of an audio system, a mobile device (such as a cellular telephone), a laptop computer, a tablet device, a smart speaker, or another type of device.

According to some alternative implementations the apparatus 500 may be, or may include, a server. In some such examples, the apparatus 500 may be, or may include, an encoder. Accordingly, in some instances the apparatus 500 may be a device that is configured for use within an audio environment, such as a home audio environment, whereas in other instances the apparatus 500 may be a device that is configured for use in "the cloud," e.g., a server.

In this example, the apparatus 500 includes an interface system 505 and a control system 510. The interface system 505 may, in some implementations, be configured for communication with one or more other devices of an audio environment. The audio environment may, in some examples, be a home audio environment. In other examples, the audio environment may be another type of environment, such as an office environment, an automobile environment, a train environment, a street or sidewalk environment, a park environment, etc. The interface system 505 may, in some implementations, be configured for exchanging control information and associated data with audio devices of the audio environment. The control information and associated data may, in some examples, pertain to one or more software applications that the apparatus 500 is executing.

The interface system 505 may, in some implementations, be configured for receiving, or for providing, a content stream. The content stream may include audio data. The audio data may include, but may not be limited to, audio signals. In some instances, the audio data may include spatial data, such as channel data and/or spatial metadata. In some examples, the content stream may include video data and audio data corresponding to the video data.

The interface system 505 may include one or more network interfaces and/or one or more external device interfaces (such as one or more universal serial bus (USB) interfaces). According to some implementations, the interface system 505 may include one or more wireless interfaces. The interface system 505 may include one or more devices for implementing a user interface, such as one or more microphones, one or more speakers, a display system, a touch sensor system and/or a gesture sensor system. In some examples, the interface system 505 may include one or more interfaces between the control system 510 and a memory system, such as the optional memory system 515 shown in FIG. 5. However, the control system 510 may include a memory system in some instances. The interface system 505 may, in some implementations, be configured for receiving input from one or more microphones in an environment.

The control system 510 may, for example, include a general purpose single- or multi-chip processor, a digital signal processor (DSP), an application specific integrated circuit (ASIC), a field programmable gate array (FPGA) or other programmable logic device, discrete gate or transistor logic, and/or discrete hardware components.

In some implementations, the control system 510 may reside in more than one device. For example, in some implementations a portion of the control system 510 may reside in a device within one of the environments depicted herein and another portion of the control system 510 may reside in a device that is outside the environment, such as a server, a mobile device (e.g., a smartphone or a tablet computer), etc. In other examples, a portion of the control system 510 may reside in a device within one environment and another portion of the control system 510 may reside in one or more other devices of the environment. For example, a portion of the control system 510 may reside in a device that is implementing a cloud-based service, such as a server, and another portion of the control system 510 may reside in another device that is implementing the cloud-based service, such as another server, a memory device, etc. The interface system 505 also may, in some examples, reside in more than one device.

In some implementations, the control system 510 may be configured for performing, at least in part, the methods disclosed herein. According to some examples, the control system 510 may be configured for implementing methods of clustering audio objects.

Some or all of the methods described herein may be performed by one or more devices according to instructions (e.g., software) stored on one or more non-transitory media. Such non-transitory media may include memory devices such as those described herein, including but not limited to random access memory (RAM) devices, read-only memory (ROM) devices, etc. The one or more non-transitory media may, for example, reside in the optional memory system 515 shown in FIG. 5 and/or in the control system 510. Accordingly, various innovative aspects of the subject matter described in this disclosure can be implemented in one or more non-transitory media having software stored thereon. The software may, for example, include instructions for determining an allocation of clusters to various categories of rendering metadata, assigning or rendering audio objects to the allocated clusters, etc. The software may, for example, be executable by one or more components of a control system such as the control system 510 of FIG. 5.

In some examples, the apparatus 500 may include the optional microphone system 520 shown in FIG. 5. The optional microphone system 520 may include one or more microphones. In some implementations, one or more of the microphones may be part of, or associated with, another device, such as a speaker of the speaker system, a smart audio device, etc. In some examples, the apparatus 500 may not include a microphone system 520. However, in some such implementations the apparatus 500 may nonetheless be configured to receive microphone data for one or more microphones in an audio environment via the interface system 510. In some such implementations, a cloud-based implementation of the apparatus 500 may be configured to receive microphone data, or a noise metric corresponding at least in part to the microphone data, from one or more microphones in an audio environment via the interface system 510.

According to some implementations, the apparatus 500 may include the optional loudspeaker system 525 shown in FIG. 5. The optional loudspeaker system 525 may include one or more loudspeakers, which also may be referred to herein as "speakers" or, more generally, as "audio reproduction transducers." In some examples (e.g., cloud-based implementations), the apparatus 500 may not include a loudspeaker system 525. In some implementations, the apparatus 500 may include headphones. Headphones may be connected or coupled to the apparatus 500 via a headphone jack or via a wireless connection (e.g., BLUETOOTH).

Some aspects of present disclosure include a system or device configured (e.g., programmed) to perform one or more examples of the disclosed methods, and a tangible computer readable medium (e.g., a disc) which stores code for implementing one or more examples of the disclosed methods or steps thereof. For example, some disclosed systems can be or include a programmable general purpose processor, digital signal processor, or microprocessor, programmed with software or firmware and/or otherwise configured to perform any of a variety of operations on data, including an embodiment of disclosed methods or steps thereof. Such a general purpose processor may be or include a computer system including an input device, a memory, and a processing subsystem that is programmed (and/or otherwise configured) to perform one or more examples of the disclosed methods (or steps thereof) in response to data asserted thereto.

Some embodiments may be implemented as a configurable (e.g., programmable) digital signal processor (DSP) that is configured (e.g., programmed and otherwise configured) to perform required processing on audio signal(s), including performance of one or more examples of the disclosed methods. Alternatively, embodiments of the disclosed systems (or elements thereof) may be implemented as a general purpose processor (e.g., a personal computer (PC)

or other computer system or microprocessor, which may include an input device and a memory) which is programmed with software or firmware and/or otherwise configured to perform any of a variety of operations including one or more examples of the disclosed methods. Alternatively, elements of some embodiments of the inventive system are implemented as a general purpose processor or DSP configured (e.g., programmed) to perform one or more examples of the disclosed methods, and the system also includes other elements (e.g., one or more loudspeakers and/or one or more microphones). A general purpose processor configured to perform one or more examples of the disclosed methods may be coupled to an input device (e.g., a mouse and/or a keyboard), a memory, and a display device.

Another aspect of present disclosure is a computer readable medium (for example, a disc or other tangible storage medium) which stores code for performing (e.g., coder executable to perform) one or more examples of the disclosed methods or steps thereof.

While specific embodiments of the present disclosure and applications of the disclosure have been described herein, it will be apparent to those of ordinary skill in the art that many variations on the embodiments and applications described herein are possible without departing from the scope of the disclosure described and claimed herein. It should be understood that while certain forms of the disclosure have been shown and described, the disclosure is not to be limited to the specific embodiments described and shown or the specific methods described.

Enumerated Example Embodiments

Example 1. A method for clustering audio objects, comprising: identifying a plurality of audio objects, wherein an audio object is associated with metadata that indicates spatial position information and rendering metadata; assigning audio objects of the plurality of audio objects to categories of rendering metadata of a plurality of categories of rendering metadata, wherein at least one category of rendering metadata comprises a plurality of types of rendering metadata to be preserved; determining an allocation of a plurality of audio object clusters to each category of rendering metadata, wherein an audio object cluster comprises one or more audio objects of the plurality of audio objects having similar attributes; rendering audio objects of the plurality of audio objects to an allocated plurality of audio object clusters based on the metadata that indicates spatial position information and based on the assignments of the audio objects to the categories of rendering metadata.

Example 2. The method of example 1, wherein the categories of rendering metadata comprise a bypass mode category and a virtualization category.

Example 3. The method of example 2, wherein the plurality of types of rendering metadata included in the virtualization category comprise a plurality of types of virtualization, each representing a distance from a head center to the audio object.

Example 4. The method of example 1, wherein the categories of rendering metadata comprise one of a zone category or a snap category.

Example 5. The method of any one of examples 1-4, wherein an audio object assigned to a first category of rendering metadata is inhibited from being assigned to an audio object cluster of the plurality of audio object clusters allocated to a second category of rendering metadata.

Example 6. The method of any one of examples 1-5, further comprising transmitting an audio signal that comprises spatial information and gain information associated with each audio object cluster of the allocated plurality of audio object clusters, wherein the audio signal has less spatial distortion than an audio signal comprising spatial information and gain information associated with audio object clusters in which an audio object assigned to the first category of rendering metadata is assigned to an audio object cluster associated with the second category of rendering metadata.

Example 7. The method of any one of examples 1-6, wherein determining the allocation of the plurality of audio object clusters to each category of rendering metadata comprises: (i) determining an initial allocation of an initial plurality of audio object clusters to each category of rendering metadata; (ii) assigning the audio objects to the initial plurality of audio object clusters based on the metadata that indicates spatial position information and based on the assignments of the audio objects to the categories of rendering metadata; (iii) for each category of rendering metadata, determining a category cost of the assignment of the audio objects to the initial plurality of audio object clusters; (iv) determining an updated allocation of the initial plurality of audio object clusters to each category of rendering metadata based at least in part on the category cost for each category of rendering metadata; and (iv) repeating (ii)-(iv) until a stopping criterion is reached.

Example 8. The method of example 7, wherein determining the category cost of the assignment of the audio objects to the initial plurality of audio object clusters is based on positions of audio object clusters allocated to the category of rendering metadata and positions of audio objects assigned to the audio object clusters allocated to the category of rendering metadata.

Example 9. The method of example 8, wherein the category cost is based on a left versus right placement of an audio object relative to a left versus right placement of an audio object cluster the audio object has been assigned to.

Example 10. The method of any one of examples 7-9, wherein determining the category cost of the assignment of the audio objects to the initial plurality of audio object clusters is based on loudness of the audio objects.

Example 11. The method of any one of examples 7-10, wherein determining the category cost of the assignment of the audio objects to the initial plurality of audio object clusters is based on a distance of an audio object to an audio object cluster the audio object has been assigned to.

Example 12. The method of any one of examples 7-11, wherein determining the category cost of the assignment of the audio objects to the initial plurality of audio object clusters is based on a similarity of a type of rendering metadata of an audio object to a type of rendering metadata of an audio object cluster the audio object has been assigned to.

Example 13. The method of any one of examples 7-12, further comprising determining a global cost based on the category cost for each category of rendering metadata, wherein the updated allocation of the initial plurality of audio object clusters is based on the global cost.

Example 14. The method of example 12, wherein repeating (ii)-(iv) until the stopping criterion is reached comprises determining a minimum of the global cost has been achieved.

Example 15. The method of any one of examples 7-14, wherein determining the updated allocation comprises changing a number of audio object clusters allocated to at least one category of rendering metadata of the plurality of categories of rendering metadata.

Example 16. The method of example 15, further comprising determining a global cost based on the category cost for each category of rendering metadata, wherein the number of audio object clusters is determined based on the global cost.

Example 17. The method of example 16, wherein determining the number of audio object clusters comprises minimizing the global cost subject to a constraint on the number of audio object clusters that indicates a maximum number of audio object clusters that can be added.

Example 18. The method of any one of examples 1-17, wherein rendering audio objects of the plurality of audio objects to the allocated plurality of audio object clusters comprises determining an object-to-cluster gain for each audio object of the plurality of audio objects when rendered to one or more audio object clusters allocated to a category of rendering metadata to which the audio object is assigned.

Example 19. The method of example 18, wherein object-to-cluster gains for audio objects assigned to a first category of the plurality of categories of rendering metadata are determined separately from object-to-cluster gains for audio objects assigned to a second category of the plurality of categories of rendering metadata.

Example 20. The method of example 18, wherein object-to-cluster gains for audio objects assigned to a first category of the plurality of categories of rendering metadata are determined jointly with object-to-cluster gains for audio objects assigned to a second category of the plurality of categories of rendering metadata.

Example 21. The method of any one of examples 1-20, further comprising transmitting an audio signal that comprises spatial information and gain information associated with each audio object cluster of the allocated plurality of audio object clusters, wherein transmitting the audio signal requires less bandwidth than an audio signal that comprises spatial information and gain information associated with each audio object of the plurality of audio objects.

Example 22. An apparatus configured for implementing the method of any one of examples 1-21.

Example 23. A system configured for implementing the method of any one of examples 1-21.

Example 24. One or more non-transitory media having software stored thereon, the software including instructions for controlling one or more devices to perform the method of any one of examples 1-21.

The invention claimed is:

1. A method for clustering audio objects, comprising:

identifying a plurality of audio objects, wherein an audio object of the plurality of audio objects is associated with respective metadata that indicates respective spatial position information and respective rendering metadata;

assigning audio objects of the plurality of audio objects to categories of rendering metadata of a plurality of categories of rendering metadata, wherein at least one category of rendering metadata comprises a plurality of types of rendering metadata to be preserved;

determining an allocation of a plurality of audio object clusters to each category of rendering metadata, wherein an audio object cluster comprises one or more audio objects of the plurality of audio objects having similar attributes;

rendering audio objects of the plurality of audio objects to an allocated plurality of audio object clusters based on the metadata that indicates spatial position information and based on the assignments of the audio objects to the categories of rendering metadata.

2. The method of claim 1, wherein the categories of rendering metadata comprise a bypass mode category and a virtualization category.

3. The method of claim 2, wherein the plurality of types of rendering metadata included in the virtualization category comprise a plurality of types of virtualization, each representing a distance from a head center to the audio object.

4. The method of claim 1, wherein the categories of rendering metadata comprise one of a zone category or a snap category, or wherein an audio object assigned to a first category of rendering metadata is inhibited from being assigned to an audio object cluster of the plurality of audio object clusters allocated to a second category of rendering metadata.

5. The method of claim 1, further comprising transmitting an audio signal that comprises spatial information and gain information associated with each audio object cluster of the allocated plurality of audio object clusters, wherein the audio signal has less spatial distortion than an audio signal comprising spatial information and gain information associated with audio object clusters in which an audio object assigned to the first category of rendering metadata is assigned to an audio object cluster associated with the second category of rendering metadata.

6. The method of claim 1, wherein determining the allocation of the plurality of audio object clusters to each category of rendering metadata comprises:

(i) determining an initial allocation of an initial plurality of audio object clusters to each category of rendering metadata;

(ii) assigning the audio objects to the initial plurality of audio object clusters based on the metadata that indicates spatial position information and based on the assignments of the audio objects to the categories of rendering metadata;

(iii) for each category of rendering metadata, determining a category cost of the assignment of the audio objects to the initial plurality of audio object clusters;

(iv) determining an updated allocation of the initial plurality of audio object clusters to each category of rendering metadata based at least in part on the category cost for each category of rendering metadata; and (v) repeating (ii)-(iv) until a stopping criterion is reached.

7. The method of claim 6, wherein determining the category cost of the assignment of the audio objects to the initial plurality of audio object clusters is based on positions of audio object clusters allocated to the category of rendering metadata and positions of audio objects assigned to the audio object clusters allocated to the category of rendering metadata.

8. The method of claim 7, wherein the category cost is based on a left versus right placement of an audio object relative to a left versus right placement of an audio object cluster the audio object has been assigned to.

9. The method of claim 6, wherein determining the category cost of the assignment of the audio objects to the initial plurality of audio object clusters is based on:

loudness of the audio objects; and/or a distance of an audio object to an audio object cluster the audio object has been assigned to, and/or a similarity of a type of rendering metadata of an audio object to a type of rendering metadata of an audio object cluster the audio object has been assigned to.

10. The method of claim 6, further comprising determining a global cost based on the category cost for each category of rendering metadata, wherein the updated allocation of the initial plurality of audio object clusters is based on the global cost.

11. The method of claim 10, wherein repeating (ii)-(iv) until the stopping criterion is reached comprises determining a minimum of the global cost has been achieved.

12. The method of claim 6, wherein determining the updated allocation comprises changing a number of audio object clusters allocated to at least one category of rendering metadata of the plurality of categories of rendering metadata.

13. The method of claim 12, further comprising determining a global cost based on the category cost for each category of rendering metadata, wherein the number of audio object clusters is determined based on the global cost.

14. The method of claim 13, wherein determining the number of audio object clusters comprises minimizing the global cost subject to a constraint on the number of audio object clusters that indicates a maximum number of audio object clusters that can be added.

15. The method of claim 1, wherein rendering audio objects of the plurality of audio objects to the allocated plurality of audio object clusters comprises determining an object-to-cluster gain for each audio object of the plurality of audio objects when rendered to one or more audio object clusters allocated to a category of rendering metadata to which the audio object is assigned.

16. The method of claim 15, wherein object-to-cluster gains for audio objects assigned to a first category of the plurality of categories of rendering metadata are determined either:

separately from object-to-cluster gains for audio objects assigned to a second category of the plurality of categories of rendering metadata; or jointly with object-to-cluster gains for audio objects assigned to a second category of the plurality of categories of rendering metadata.

17. The method of claim 1, further comprising transmitting an audio signal that comprises spatial information and gain information associated with each audio object cluster of the allocated plurality of audio object clusters, wherein transmitting the audio signal requires less bandwidth than an audio signal that comprises spatial information and gain information associated with each audio object of the plurality of audio objects.

18. An apparatus configured for implementing the method of claim 1.

19. A system configured for implementing the method of claim 1.

20. One or more non-transitory media having software stored thereon, the software including instructions for controlling one or more devices to perform the method of claim 1.

* * * * *